United States Patent
Koreeda et al.

(10) Patent No.: US 7,821,906 B2
(45) Date of Patent: Oct. 26, 2010

(54) OBJECTIVE LENS FOR OPTICAL PICK-UP

(75) Inventors: Daisuke Koreeda, Saitama-ken (JP); Koichi Maruyama, Tokyo (JP)

(73) Assignee: Hoya Corporation, Tokyo (JP)

( * ) Notice: Subject to any disclaimer, the term of this patent is extended or adjusted under 35 U.S.C. 154(b) by 1233 days.

(21) Appl. No.: 11/155,477

(22) Filed: Jun. 20, 2005

(65) Prior Publication Data
US 2005/0281173 A1 Dec. 22, 2005

(30) Foreign Application Priority Data
Jun. 21, 2004 (JP) .............................. 2004-181966

(51) Int. Cl.
*G11B 7/135* (2006.01)
(52) U.S. Cl. ................................ 369/112.25; 369/44.23
(58) Field of Classification Search ............ 369/112.23, 369/112.01, 44.23, 112.06, 112.2, 112.25, 369/53.23, 53.28
See application file for complete search history.

(56) References Cited

U.S. PATENT DOCUMENTS

| | | | | |
|---|---|---|---|---|
| 5,889,748 A * | 3/1999 | Shimano et al. | ........ | 369/112.26 |
| 6,807,019 B2 | 10/2004 | Takeuchi et al. | | |
| 6,865,025 B2 * | 3/2005 | Kimura | ...................... | 359/565 |
| 7,102,980 B2 * | 9/2006 | Saito et al. | ............. | 369/112.07 |
| 7,206,275 B2 * | 4/2007 | Saitoh et al. | ............ | 369/112.05 |
| 2001/0008513 A1 * | 7/2001 | Arai et al. | .............. | 369/112.08 |
| 2002/0003767 A1 | 1/2002 | Ota et al. | | |
| 2002/0009038 A1 * | 1/2002 | Kim | ....................... | 369/112.23 |
| 2002/0012313 A1 * | 1/2002 | Kimura et al. | ......... | 369/112.08 |
| 2002/0191526 A1 * | 12/2002 | Saito | ..................... | 369/112.26 |
| 2003/0185134 A1 * | 10/2003 | Kimura et al. | ......... | 369/112.08 |

(Continued)

FOREIGN PATENT DOCUMENTS
JP 9-145994 6/1997

(Continued)

*Primary Examiner*—Wayne R Young
*Assistant Examiner*—Thomas D Alunkal
(74) *Attorney, Agent, or Firm*—Greenblum & Bernstein, P.L.C.

(57) ABSTRACT

An objective lens for an optical pick-up which is used to record data to and/or to reproduce data from at least three types of optical discs by selectively using one of at least three light beams having different wavelengths is provided. When thicknesses of a first, second and optical discs are represented by t1, t2 and t3, respectively, a relationship $t1 \leq t2 < t3$ is satisfied. When numerical apertures required for the first, second and third optical discs are represented by NA1, NA2 and NA3, respectively, a relationship $NA1 \geq NA2 > NA3$ is satisfied. The first, second and third light beams are incident on the objective lens as substantially collimated light beams, respectively. In this configuration, at least one of surfaces of the objective lens includes a first area for attaining the numerical aperture required for recording data to and/or reproducing data from the third optical disc, and a second area located outside the first area. The first area includes an inner area including an optical axis of the objective lens, and an outer area located outside the inner area. The outer area is configured to converge the third light beam on a data recording layer of the third optical disc with an amount of an aberration being substantially zero. The objective lens satisfies a condition: $0.75 < h1a/h1 < 0.87 \ldots$ (1), where h1 represents an effective radius of the first area, and h1a represents an effective radius of the inner area.

12 Claims, 13 Drawing Sheets

U.S. PATENT DOCUMENTS

| | | | |
|---|---|---|---|
| 2003/0227859 A1* | 12/2003 | Hirai | 369/112.12 |
| 2004/0246873 A1 | 12/2004 | Maruyama et al. | |
| 2004/0257958 A1* | 12/2004 | Kimura et al. | 369/112.03 |
| 2005/0002118 A1 | 1/2005 | Maruyama et al. | |
| 2005/0078593 A1 | 4/2005 | Maruyama et al. | |
| 2005/0094536 A1* | 5/2005 | Kimura | 369/112.05 |
| 2005/0157624 A1 | 7/2005 | Koreeda et al. | |

FOREIGN PATENT DOCUMENTS

| | | |
|---|---|---|
| JP | 2002-50069 | 2/2002 |
| JP | 2002-298422 | 10/2002 |

* cited by examiner

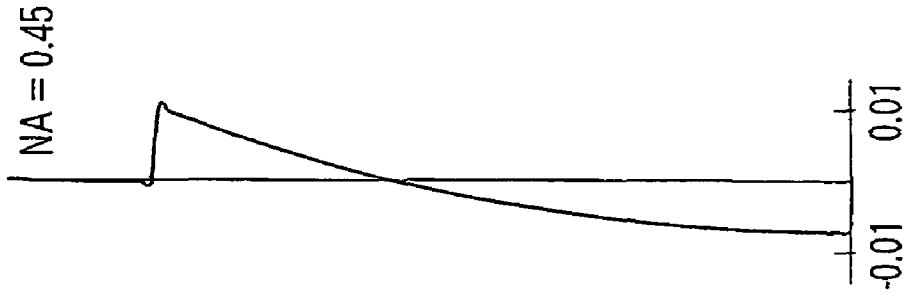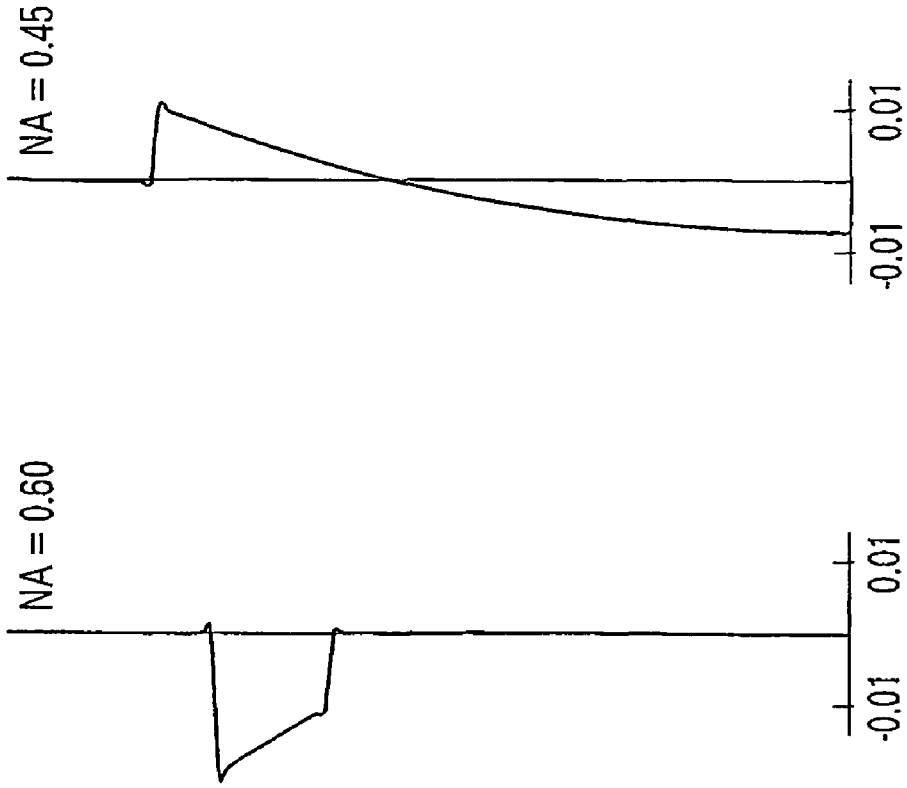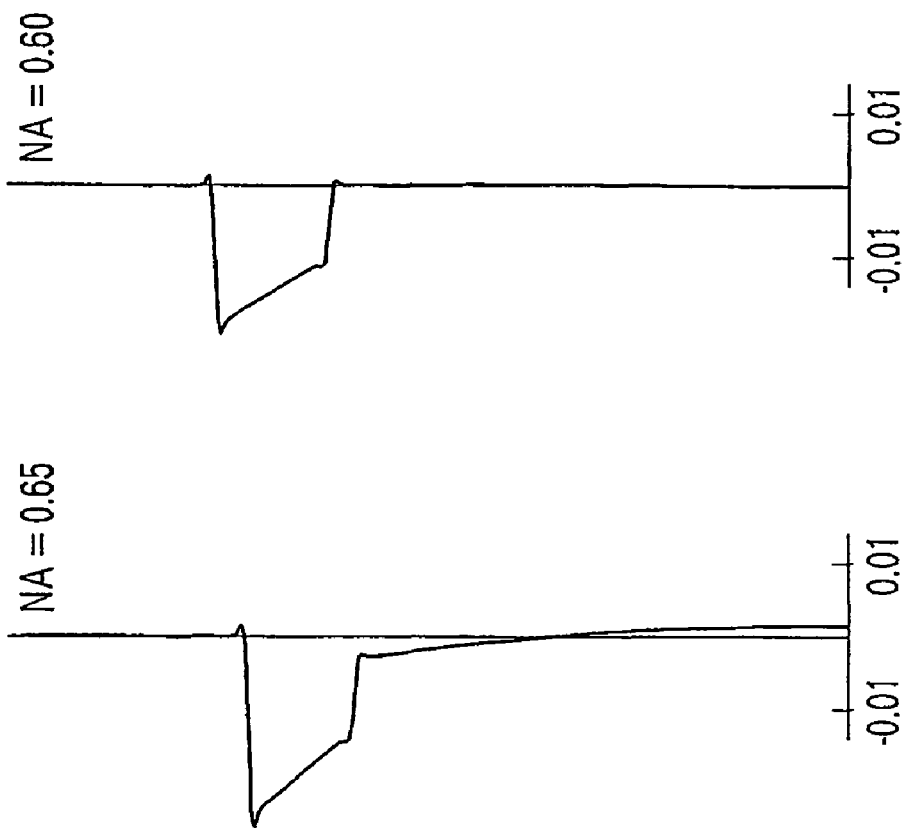

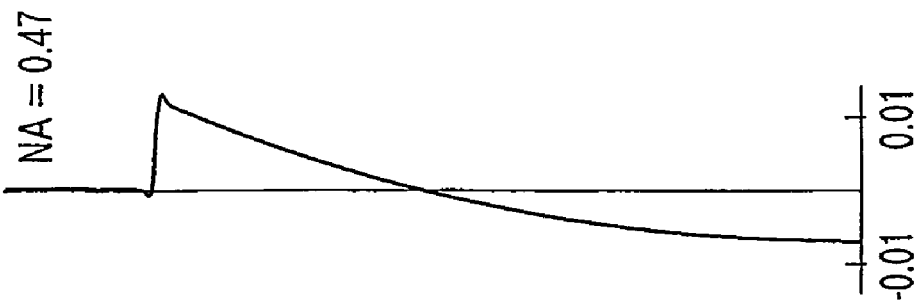
FIG.9A  NA = 0.65
FIG.9B  NA = 0.63
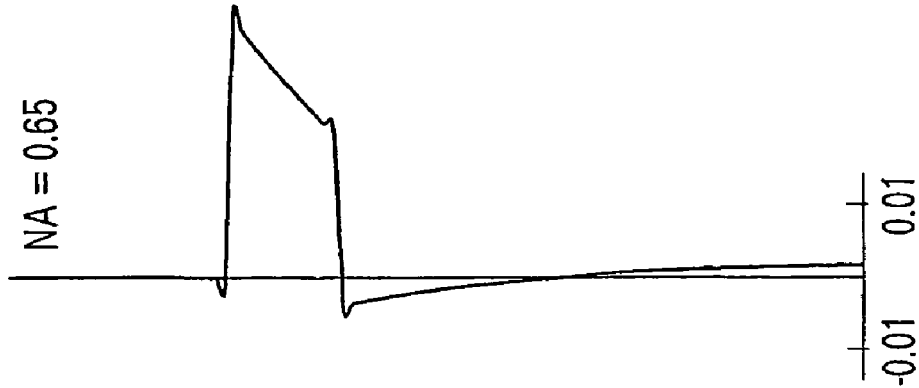
FIG.9C  NA = 0.47

NA = 0.65  NA = 0.63  NA = 0.47

OBJECTIVE LENS FOR OPTICAL PICK-UP

INCORPORATION BY REFERENCE

This application claims priority of Japanese Patent Application No. 2004-181966, filed on Jun. 21, 2004, the entire subject matter of the application is incorporated herein by reference thereto.

BACKGROUND OF THE INVENTION

The present invention relates to an objective tens for an optical pick-up used for an optical disc drive, which is capable of recording data to and/or reproducing data from a plurality of types of optical discs having different recording densities and having different thicknesses of cover layers.

There are various types of optical discs on which digital information is recorded at various densities, respectively. For example, a DVD (digital versatile disc) has a recording density higher than that of a CD (compact disc) or a CD-R (CD Recordable) and has a cover layer thinner than that of the CD or CD-R.

When the recording/reproducing operation for the DVD having a higher recording density is performed, a smaller beam spot diameter is required on a data recording layer of the DVD relative to a beam spot used for the CD having a lower recording density. To provide such a small beam spot for the recording/reproducing operation for the DVD, it is required to use an optical system providing an NA (numerical aperture) higher than an NA attained by an optical system designed specifically for the CD.

The diameter of the beam spot decreases as a wavelength of the laser beam decreases. Therefore, in general, a laser beam having a wavelength of about 660 nm, which is lower than a wavelength of about 780 nm typically used for the CD, is used for the DVD.

To support both of the DVD and CD, recently, optical disc drives employing a laser right source capable of emitting laser beams having different wavelengths are widely used.

In the following, the term "optical disc drive" includes a device designed specifically for a recording operation, a device designed specifically for a reproducing operation, and a device capable of performing both of the recording and reproducing operations.

Japanese Patent Provisional Publication No. HEI 9-145994 (hereafter, referred to as a document 1) discloses an objective lens designed to support both of the DVD and CD. By using the objective lens disclosed in the document 1, laser beams for the DVD and CD are suitably converged onto data recording layers of the DVD and CD, respectively.

The objective lens disclosed in the document 1 has a surface which is divided into more than three regions. An outermost region of the surface is designed such that a beam used for the DVD is suitably converged onto the data recording layer of the DVD. A region formed between an innermost region and the outer most region is designed such that a beam used for the CD is suitably converged onto the data recording layer of the CD. According to this structure, the objective lens can be used as a compatible lens supporting two types of optical discs having different recording densities.

In an optical system employing the objective lens of the document 1, a collimated beam is incident on the objective lens in both of the cases of the CD and the DVD. By this structure, the occurrence of an off-axis aberration such as a coma and astigmatism, which would be caused when the objective lens is shifted by a tracking operation in a direction perpendicular to an optical axis of the objective lens, is prevented.

Recently, new technical standards regarding optical discs having further higher recording densities are proposed. One of such new standard optical discs is an HD DVD (High Definition DVD) having a recording density higher than that of the DVD. The HD DVD has a thickness of the cover layer smaller than or equal to that of the DVD. For the HD DVD, a laser beam (a so-called blue laser having a wavelength of, for example, about 405 nm) having a wavelength smaller than that used for the DVD is required.

With the progress of the practical use of the optical discs having further higher recording densities such as an HD DVD, the demand for optical disc drives which can support existing optical discs (e.g., CD and DVD) and the optical discs of the new technical standards (e.g., HD DVD) is increasing. To accomplish such an optical disc drive, an objective lens that is capable of converging incident beam on the data recording layer of each of the plurality of types of optical discs including the CD, DVD and HD DVD is required.

However, as described above, a conventional objective lens (i.e., the objective lend disclosed in the document 1) is not designed for the new standard optical disc. Therefore, if a beam of the blue laser is incident on the objective lens, the objective lens can not form a beam spot suitable for the recording/reproducing operation for the new standard optical disc because in such a case aberrations including a spherical aberration are caused on a data recording layer of the new standard optical disc.

SUMMARY OF THE INVENTION

The present invention is advantageous in that it provides an objective lens which is configured to form a suitable beam spot on a data recording layer of each of a plurality of types of optical discs including existing optical discs and new standard optical discs, and to sufficiently suppress aberrations which are caused when the objective lens is shifted by a tracking operation.

According to an aspect of the invention, there is provided an objective lens for an optical pick-up which is used to record data to and/or to reproduce data from at least three types of optical discs by selectively using one of at least three light beams having different wavelengths. The at least three types of optical discs have at least two different thicknesses of cover layers. When a thickness of a first optical disc of the at least three types of optical discs to be used for recording data and/or reproducing data using a first light beam of the at least three light beams having a wavelength shortest of all the wavelengths of the at least three light beams is represented by t1, a thickness of a second optical disc of the at least three types of optical discs to be used for recording data and/or reproducing data using a second light beam of the at least three light beams having a wavelength longer than that of the first light beam is represented by t2, and a thickness of a third optical disc of the at least three types of optical discs to be used for recording data and/or reproducing data using a third light beam of the at least three light beams having a wavelength longest of all of the wavelengths of the at least three light beams is represented by t3, a relationship $t1 \leq t2 < t3$ is satisfied. When a numerical aperture required for recording data to and/or reproducing data from the first optical disc is represented by NA1, a numerical aperture required for recording data to and/or a reproducing data from the second optical disc is represented by NA2, and a numerical aperture required for recording data to and/or reproducing data from the third optical disc is represented by NA3, a relationship NA1≧NA2>NA3 is satisfied. The first, second and third light beams are incident on the objective lens as substantially collimated light beams, respectively. In this configuration, at least one of surfaces of the objective lens includes a first area for attaining the numerical aperture required for recording data to and/or reproducing data from the third optical disc, and a second area located outside the first area. The first area includes an inner area including an optical axis of the objective lens, and an outer area located outside the inner area. The outer area is configured to converge the third light beam on a data recording layer of the third optical disc with an amount of an aberration being substantially zero. The objective lens satisfies a condition:

$$0.75 < h1a/h1 < 0.87 \qquad (1)$$

where h1 represents an effective radius of the first area, and h1a represents an effective radius of the inner area.

With this configuration, the off-axis aberrations (caused when the objective lens is shifted in a direction perpendicular to an optical axis of the objective lens by a tracking operation) as well as a spherical aberration are sufficiently corrected when each of the existing optical discs and the new standard optical discs is used. That is, suitable beam spots are formed on data recording layers of the at least three types of optical discs, respectively.

Optionally, the inner area may be configured to converge the second light beam on a data recording layer of the second optical disc with an amount of an aberration being substantially zero.

Still optionally, the outer area may have a diffracting structure having a function of converging the second and third light beams on data recording layers of the second and third optical discs, respectively. In this case, the diffracting structure may be configured such that a diffraction order at which diffraction efficiency for the second light beam is maximized is a first order, and a diffraction order at which diffraction efficiency for the third light beam is maximized is a first order.

Still optionally, the second area may have a first diffracting structure configured to converge the first and second light beams on data recording layers of the first and second optical discs, respectively, and not to contribute to convergence of the third light beam. In this case, the first diffracting structure may be configured such that a diffraction order at which diffraction efficiency for the first light beam is maximized is a third order, and a diffraction order at which diffraction efficiency for the second light beam is maximized is a second order.

Still optionally, the objective lens may satisfy a condition:

$$f1 \times NA1 > f2 \times NA2 \qquad (2)$$

where f1 represents a focal length of the objective lens when the first optical disc is used, and f2 represents a focal length of the objective lens when the second optical disc is used. In this case, the at least one of surfaces of the objective lens may include a third area located outside the second area. The third area may have a second diffracting structure configured to converge only the first light beam on a data recording layer of the first optical disc. The second diffracting structure is configured such that a diffraction order at which diffraction efficiency for the first light beam is maximized in the third area is different from a diffraction order at which diffraction efficiency for the first light beam is maximized in the second area.

Alternatively, the objective lens may satisfy a condition:

$$f1 \times NA1 < f2 \times NA2 \qquad (3)$$

where f1 represents a focal length of the objective lens when the first optical disc is used, and f2 represents a focal length of the objective lens when the second optical disc is used. In this case, the at least one of surfaces of the objective lens may include a third area located outside the second area. The third area may have a second diffracting structure configured to converge only the second light beam on a data recording layer of the second optical disc. The second diffracting structure may be configured such that a diffraction order at which diffraction efficiency for the second light beam is maximized in the third area is different from a diffraction order at which diffraction efficiency for the second light beam is maximized in the second area.

According to another aspect of the invention, there is provided an optical pick-up used for recording data to and/or reproducing data from at least three types of optical discs having at least two different thicknesses of cover layers. The optical pick-up is provided with light sources capable of emitting at least three light beams having different wavelengths respectively corresponding to the at least three types of optical discs. One of the at least three light beams is selectively emitted when one of the at least three types of optical discs is used. Further, the optical pick-up is provided with an objective lens. When a thickness of a first optical disc of the at least three types of optical discs to be used for recording data and/or reproducing data using a first light beam of the at least three light beams having a wavelength shortest of all the wavelengths of the at least three light beams is represented by t1, a thickness of a second optical disc of the at least three types of optical discs to be used for recording data and/or reproducing data using a second light beam of the at least three light beams having a wavelength longer than that of the first light beam is represented by t2, and a thickness of a third optical disc of the at least three types of optical discs to be used for recording data and/or reproducing data using a third light beam of the at least three light beams having a wavelength longest of all of the wavelengths of the at least three light beams is represented by t3, a relationship t1≦t2<t3 is satisfied. When a numerical aperture required for recording data to and/or reproducing data from the first optical disc is represented by NA1, a numerical aperture required for recording data to and/or reproducing data from the second optical disc is represented by NA2, and a numerical aperture required for recording data to and/or reproducing data from the third optical disc is represented by NA3, a relationship NA1≧NA2>NA3 is satisfied. The first, second and third light beams are incident on the objective lens as substantially collimated light beams, respectively. In this configuration, at least one of surfaces of the objective lens includes a first area for attaining the numerical aperture required for recording data to and/or reproducing data from the third optical disc, and a second area located outside the first area. The first area includes an inner area including an optical axis of the objective lens, and an outer area located outside the inner area. The outer area is configured to converge the third light beam on a data recording layer of the third optical disc with an amount of an aberration being substantially zero. The objective lens satisfies a condition:

$$\text{wherein } 0.75 < h1a/h1 < 0.87 \qquad (1)$$

where h1 represents an effective radius of the first area, and h1a represents an effective radius of the inner area. If a wavelength of the first light beam is represented by $\lambda_1$, a refractive index of the objective lens for the first light beam is represented by $n_1$, a wavelength of the third light beam is represented by $\lambda_3$, and a refractive index of the objective lens for the third light beam is represented by $n_3$, the optical pick-up satisfies a condition:

$$\lambda_1/(n_1-1):\lambda_3/(n_3-1) \approx 1:2 \qquad (4)$$

With this configuration, the off-axis aberrations (caused when the objective lens is shifted in a direction perpendicular to an optical axis of the objective lens by a tracking operation) as well as a spherical aberration are sufficiently corrected when each of the existing optical discs and the new standard optical discs is used. That is, suitable beam spots are formed on data recording layers of the at least three types of optical discs, respectively. Even if the condition (4) holds, such performance can be attained.

Optionally, the inner area of the objective lens may be configured to converge the second light beam on a data recording layer of the second optical disc with an amount of an aberration being substantially zero.

Still optionally, the outer area of the objective lens may have a diffracting structure having a function of converging the second and third light beams on data recording layers of the second and third optical discs, respectively. In this case, the diffracting structure may be configured such that a diffraction order at which diffraction efficiency for the second light beam is maximized is a first order, and a diffraction order at which diffraction efficiency for the third light beam is maximized is a first order.

Still optionally, the second area of the objective lens may have a first diffracting structure configured to converge the first and second light beams on data recording layers of the first and second optical discs, respectively, and not to contribute to convergence of the third light beam. In this case, the first diffracting structure may be configured such that a diffraction order at which diffraction efficiency for the first light beam is maximized is a third order, and a diffraction order at which diffraction efficiency for the second light beam is maximized is a second order.

Still optionally, the optical pick-up may satisfy a condition:

$$f1 \times NA1 > f2 \times NA2 \qquad (2)$$

where f1 represents a focal length of the objective lens when the first optical disc is used, and f2 represents a focal length of the objective lens when the second optical disc is used. In this case, the at least one of surfaces of the objective lens may include a third area located outside the second area. The third area may have a second diffracting structure configured to converge only the first light beam on a data recording layer of the first optical disc. The second diffracting structure may be configured such that a diffraction order at which diffraction efficiency for the first light beam is maximized in the third area is different from a diffraction order at which diffraction efficiency for the first light beam is maximized in the second area.

Alternatively, the optical pick-up may satisfy a condition:

$$f1 \times NA1 < f2 \times NA2 \qquad (3)$$

where f1 represents a focal length of the objective lens when the first optical disc is used, and f2 represents a focal length of the objective lens when the second optical disc is used. In this case, the at least one of surfaces of the objective lens may include a third area located outside the second area The third area may have a second diffracting structure configured to converge only the second light beam on a data recording layer of the second optical disc. The second diffracting structure may be configured such that a diffraction order at which diffraction efficiency for the second light beam is maximized in the third area is different from a diffraction order at which diffraction efficiency for the second light beam is maximized in the second area.

BRIEF DESCRIPTION OF THE ACCOMPANYING DRAWINGS

FIG. 6A is a graph illustrating a spherical aberration caused when the first laser beam passes through the objective lens according to a first example;

FIG. 6B is a graph illustrating a spherical aberration caused when the second laser beam passes through the objective lens according to the first example;

FIG. 6C is a graph illustrating a spherical aberration caused when the third laser beam passes through the objective lens according to the first example;

FIG. 9A is a graph illustrating a spherical aberration caused when the first laser beam passes through the objective lens according to a second example;

FIG. 9B is a graph illustrating a spherical aberration caused when the second laser beam passes through the objective lens according to the second example;

FIG. 9C is a graph illustrating a spherical aberration caused when the third laser beam passes through the objective lens according to the second example;

Figure 14A:
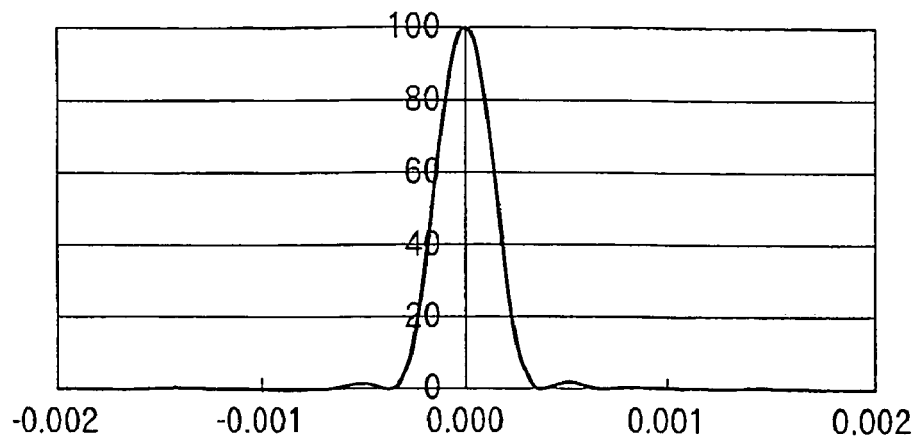
FIG. 14A is a graph illustrating the intensity of the first laser beam on the data recording layer of the first optical disc when an objective lens which has substantially the same configuration as that of the third example but is specifically designed for the first optical disc is used.
Figure 14B:
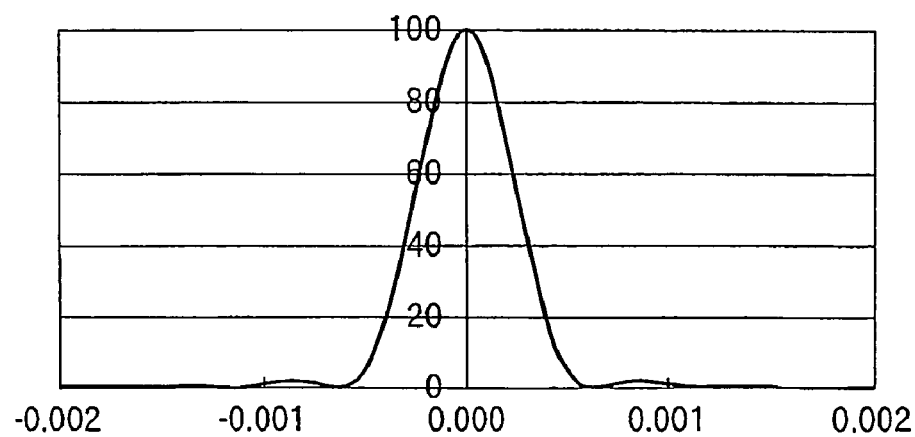
Figure 14C:
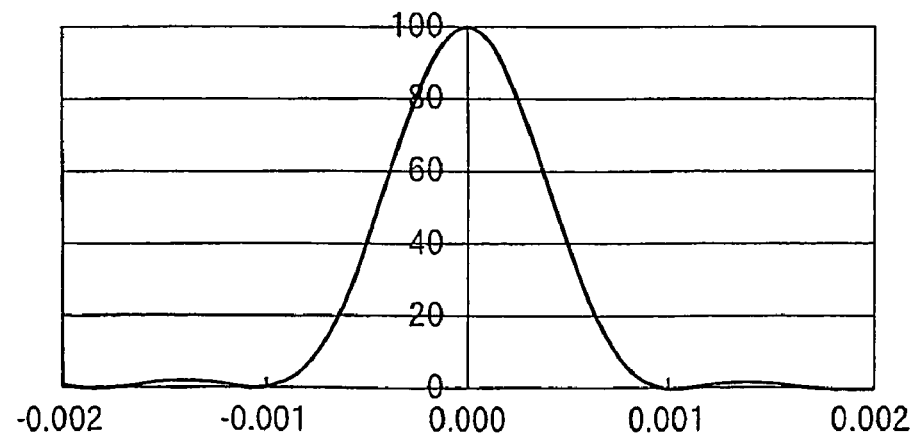

FIG. 14B is a graph illustrating the intensity of the second laser beam on the data recording layer of the second optical disc when an objective lens which has substantially the same configuration as that of the third example but is specifically designed for the second optical disc is used; and FIG. 14C is a graph illustrating the intensity of the third laser beam on the data recording layer of the third optical disc when an objective lens which has substantially the same configuration as that of the third example but is specifically designed for the third optical disc is used.

DETAILED DESCRIPTION OF THE EMBODIMENTS

Hereinafter, an embodiment according to the invention are described with reference to the accompanying drawings.

In the following, an objective lens 10 according to the embodiment and an optical pick-up 100 employing the objective lens 10 will be explained.

Figure 1:
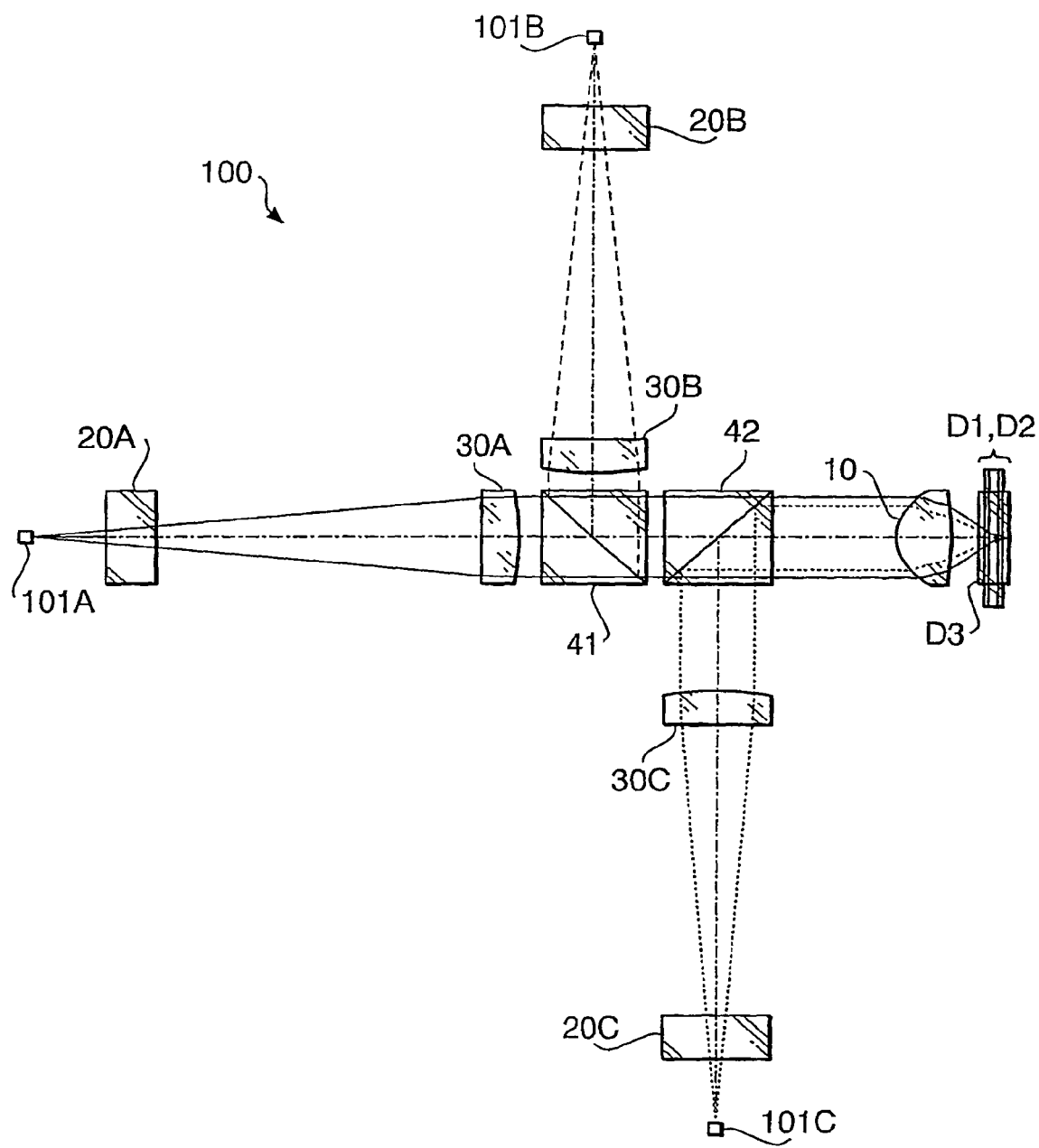
FIG. 1 shows a configuration of an optical pick-up according to an embodiment of the invention.

FIG. 1 shows a configuration of the optical pick-up 100 according to the embodiment. The optical pick-up 100 is mounted on an optical disc drive which is capable of recording data to and/or reproducing data from a plurality of types of optical discs D1, D2 and D3 which have different recording densities. In FIG. 1, a reference axis of the optical pick-up 100 is represented by a chain line, and laser beams emitted by light sources 101A, 101B and 101C are represented by a solid line, a dashed line, and a dotted line, respectively. In actuality, when the recording or reproducing operation is performed, one of optical discs D1, D2 and D3 is placed on a turn table (not shown) in the optical disc drive, and corresponding one of light sources 101A, 0101B and 101C is energized. In the optical pick-up 100, an aperture stop may be located, for example, for restricting a beam diameter of the laser beam for the optical disc D3 in order to support a numerical aperture that changes depending on the type of an optical disc being used.

In this embodiment, the optical disc D1 has the highest recording density of all of the optical discs D1, D2 and D3. The optical disc D2 has the second highest recording density. The recording density of the optical disc D3 is the lowest of all of the optical discs D1, D2 and D3. The optical disc D1 is, for example, an HD DVD, the optical disc D2 is for example, a DVD or DVD-R, and the optical disc D3 is, for example, a CD or CD-R.

As shown in FIG. 1, the optical pick-up 100 includes the light sources 101A, 101B and 101C which are respectively used for the optical discs D1, D2 and D3, diffraction gratings 20A, 20B and 20C, coupling lenses 30A, 30B and 30C, beam splitters 41 and 42, and the objective lens 10. Laser beams emitted by the light sources 101A, 101B and 101C incident on the coupling lenses 30A, 30B and 30C, via the diffraction gratings 20A, 20B and 20C, respectively. The laser beams passed through the coupling lenses 30A, 30B and 30C are directed to a common optical path by the beam splitters 41 and 42 to be incident on the objective lens 10.

In the following explanation, the laser beam for the optical disc D1 is referred to as a first laser beam, the laser beam for the optical disc D2 is referred to as a second laser beam, and the laser beam for the optical disc D3 is referred to as a third laser beam.

Each of the first, second and third laser beams emerged from the beam splitter 42 is converged by the objective lens 10 on a data recording layer of the corresponding one of the optical discs D1, D2 and D3. That is, when the optical disc D1 is used, the first laser beam is converged by the objective lens 10 on a data recording layer of the optical disc D1. When the optical disc D2 is used, the second laser beam is converged by the objective lens 10 on a data recording layer of the optical disc D2. When the optical disc D3 is used, the third laser beam is converged by the objective lens 10 on a data recording layer of the optical disc D3.

Figure 2A:
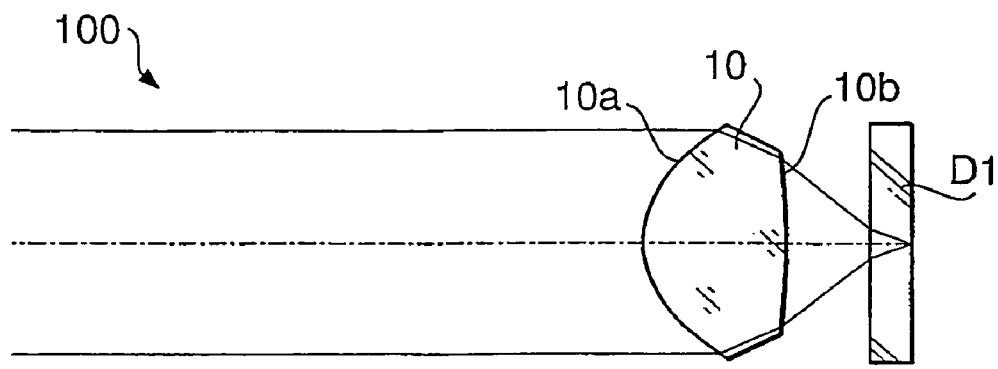
FIG. 2A shows in detail the configuration of the optical pick-up when a first optical disc having the highest recording density is used.
Figure 2B:
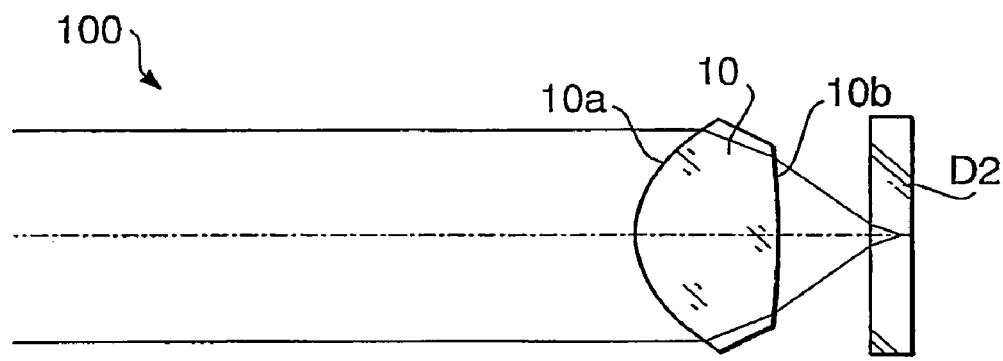
FIG. 2B shows in detail the configuration of the optical pick-up when a second optical disc having the second highest recording density is used.
Figure 2C:
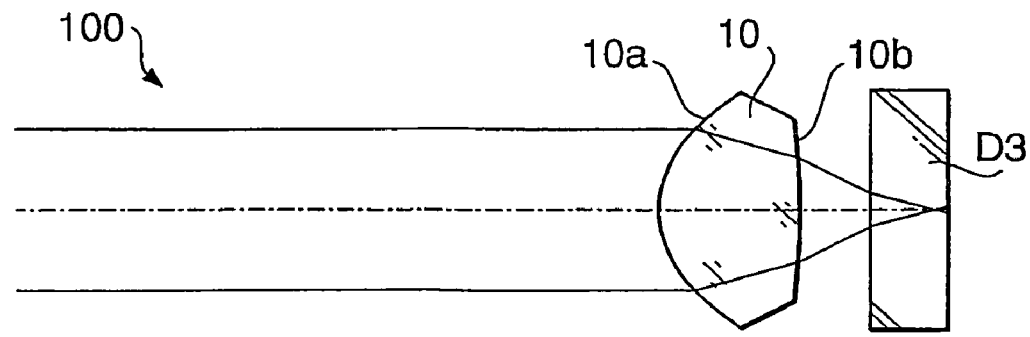
FIG. 2C shows in detail the configuration of the optical pick-up when a third optical disc having the lowest recording density is used.

FIG. 2A shows in detail the configuration of the optical pick-up 100 when the optical disc D1 is used. FIG. 2B shows in detail the configuration of the optical pick-up 100 when the optical disc D2 is used. FIG. 2C shows in detail the configuration of the optical pick-up 100 when the optical disc D3 is used. Although in each of FIG. 1 and FIGS. 2A-2C, an optical axis of the objective lens 10 coincides with the reference axis of the optical pick-up 100, there is a case where the optical axis of the objective lens 10 shifts from the reference axis by, for example, a tracking operation.

In this embodiment, given that the thicknesses of cover layers of the optical discs D1, D2 and D3 are represented by t1, t2 and t3, respectively, a relationship $t1 \leq t2 < t3$ holds.

It is required to change an NA (numerical aperture) in accordance with the type of the optical disc being used so as to attain a required diameter of a beam spot suitable for recording data to and/or reproducing data from one of the optical discs D1, D2 and D3. Since the optical disc D1 has the highest recording density, the required NA for the optical disc D1 is largest of all of the optical discs D1, D2 and D3. In this embodiment, given that the numerical apertures for recording data to and/or reproducing data from the optical discs D1, D2 and D3 are NA1, NA2 and NA3, respectively, the following relationship holds.

$$NA1 \geq NA2 > NA3$$

The light source 101A is used for recording data to and/or reproducing data from the optical disc D1 having the highest recording density. To form the beam spot having the smallest diameter of all of the beam spots for the optical discs D1, D2 and D3, the light source 101A emits the first laser beam having the shortest wavelength of all of wavelengths of the light sources 101A, 101B and 101C. The light source 101C is used for recording data to and/or reproducing data from the optical disc D3 having the lowest recording density. To form the beam spot having the largest diameter of all of the beam spots for the optical discs D1, D2 and D3, the light source 101C emits the third laser beam having the longest wavelength of all of wavelengths of the light sources 101A, 101B and 101C.

The light source 101B is used for recording data to and/or reproducing data from the optical disc D2 having the relatively high recording density. To form the beam spot having the relatively small diameter, the light source 101B emits the second laser beam having the second shortest wavelength of all of the wavelengths of the first through third laser beams.

The objective lens 10 is a biconvex single element lens made of plastic. The objective lens 10 has a surface 10a located on a light source side and a surface 10b located on an image side. If the thicknesses of the cover layers of the optical discs D1 and D3 (D2 and D3) are different from one another and the wavelengths of the light beams for the optical discs D1, D2 and D3 are different from one another, a spherical aberration changes depending on the type of the optical disc being used.

In this embodiment, at least one of the surfaces 10a and 10b is divided into a plurality of areas having different surface structures. By the configuration, each of the first to third laser beams is suitably converged on the data recording layer of the corresponding optical disc without causing the spherical aberration.

Figure 3:
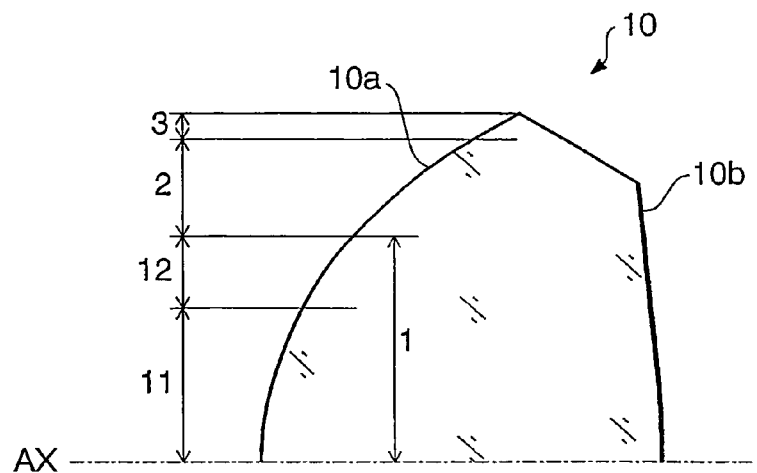
FIG. 3 shows an example of a surface structure of an objective lens according to the embodiment in the case where a front surface of the objective lens is divided into three areas.

FIG. 3 shows an example of a surface structure of the objective lens 10 in the case where the surface 10a is divided into three areas. That is, FIG. 3 is an enlarged cross-sectional view of the objective lens 10 including the optical axis AX of the objective lens 10. As shown in FIG. 3, the surface 10a of the objective lens 10 is divided into a first area 1, a second area 2 and a third area 3, which are arranged in this order from the optical axis AX toward the outside.

It should be noted that FIG. 3 shows an example of the surface structure of the objective lens 10. As described later, in another example, the objective lens 10 is not provided with the third area 3.

The first area 1 is configured to converge each of the first, second and third laser beams on the data recording layer of the corresponding one of the optical discs D1, D2 and D3. Also, the first area 1 is designed to provide a suitable NA (i.e., NA3) for the recording/reproducing operation for the optical disc D3. More specifically, as shown in FIG. 3, the first area 1 is divided into an inner area 11 and an outer area 12, which are arranged in this order from the optical axis AX toward the outside of the lens.

The inner area 11 is formed to be a continuous surface. The inner area 11 is configured such that the second laser beam for the optical disc D2 passed therethrough is suitably converged on the data recording layer of the optical disc D2. Since the inner area 11 is designed to have a form suitable for the second laser beam having an intermediate wavelength between the wavelengths of the first and third laser beams, each of the first and third laser beams passed through the inner area 11 is also converged on the data recording layer of the corresponding optical disc with the aberration being suppressed considerably.

The outer area 12 is configured such that the third laser beam for the optical disc D3 passed therethrough is suitably converged on the data recording layer of the optical disc D3 without causing a spherical aberration.

In order to reduce the amount of the spherical aberration to a small level when the optical disc other than the optical disc D3 is used (in particular when the optical disc D1 is used) while suitably converging the third laser beam on the data recording layer of the optical disc D3, the inner area 11 and the outer area 12 are designed to satisfy a condition (1):

$$0.75 < h1a/h1 < 0.87 \tag{1}$$

where h1 represents an effective radius of the first area 1, and h1a represents an effective radius of the inner area 11.

By satisfying the condition (1), the third laser beam is suitably converged on the data recording layer of the optical disc D3. If the value of the condition (1) (i.e., h1a/h1) gets larger than or equal to the upper limit of the condition (1), the outer area 12 contributing to the convergence of the third laser beam becomes too small. In this case, the beam spot suitable for the optical disc D3 can not be obtained.

If the value of the condition (1) gets smaller than or equal to the lower limit of the condition (1), the outer area 12 becomes excessively large. In this case, the size of the area generating the spherical aberration for the first laser beam becomes large, and thereby the loss of the light amount becomes large when the optical disc D1 is used.

The second area 2 is provided with a diffracting structure which is configured such that the decrease of the diffraction efficiency is almost zero for the first and second laser beams. More specifically, the diffracting structure within the second area 2 is configured such that the diffraction order at which the diffraction efficiency for the first laser beam is maximized is a third order, and the diffraction order at which the diffraction efficiency for the second laser beam is maximized is a second order.

With this structure, a wavefront of the third laser beam passed through the second area 2 does not coincide with a wavefront of the third laser beam passed through the first area 1. Therefore, the second area 2 does not contribute to the formation of the beam spot for the third laser beam.

Figures 4A, 4B, 4C:
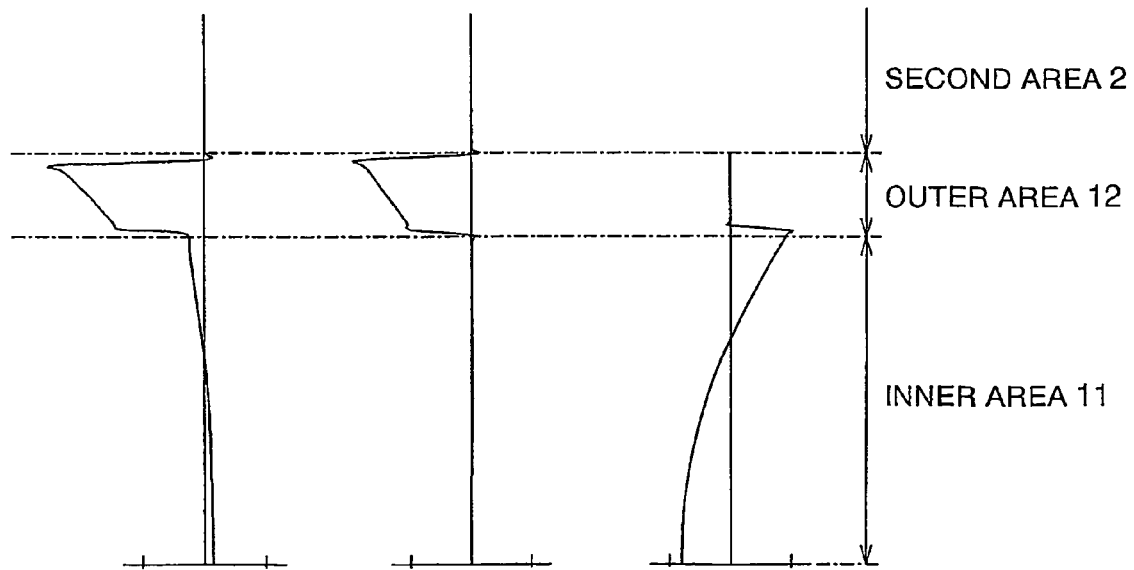
FIG. 4A is a graph illustrating a spherical aberration generated on a data recording layer of the first optical disc when a first laser beam for the first optical disc passes through the objective lens.
FIG. 4B is a graph illustrating a spherical aberration generated on a data recording layer of the second optical disc when a second laser beam for the second optical disc passes through the objective lens.
FIG. 4C is a graph illustrating a spherical aberration generated on a data recording layer of the third optical disc when a third laser beam for the third optical disc passes through the objective lens.

FIG. 4A is a graph illustrating the spherical aberration generated on the data recording layer of the optical disc D1 when the first laser beam passes through the objective lens 10. FIG. 4B is a graph illustrating the spherical aberration generated on the data recording layer of the optical disc D2 when the second laser beam passes through the objective lens 10. FIG. 4C is a graph illustrating the spherical aberration generated on the data recording layer of the optical disc D3 when the third laser beam passes through the objective lens 10. As shown in FIGS. 4A, 4B and 4C, the spherical aberration is reduced most effectively when the optical disc D2 (i.e., the second laser beam) is used. Also, the spherical aberration is reduced to a level adequate for the recording/reproducing operation for each of the optical discs D1 and D3. As shown in FIGS. 4A to 4C, the outer area 12 reduces only the spherical aberration caused when the optical disc D3 is used.

As an alternative to the above mentioned configuration of the objective lens 10, the outer area 12 may be provided with a diffracting structure. If the diffracting structure is formed within the outer area 12, the diffracting structure may be configured such that the second laser beam as well as the third laser beam is converged on the data recording layer of the corresponding optical disc. In this case, the diffracting structure is designed such that the diffraction order at which the diffraction efficiency for both of the second and third laser beams is maximized is a first order. If such a configuration is employed, the spherical aberration caused by the outer area 12 shown in FIG. 4B is suppressed.

The third area 3 is provided for the objective lens 10 if the diameter of the first laser beam incident on the first surface 10a is different from the diameter of the second laser beam incident on the first surface 10a.

The third area 3 is configured as follows when a condition (2) indicated below is satisfied.

$$f1 \times NA1 > f2 \times NA2 \tag{2}$$

In the condition (2), f1 represents a focal length of the objective lens 10 when the optical disc D1 is used, and f2 represents a focal length of the objective lens 10 when the optical disc D2 is used The diffracting structure formed in the third area 3 when the condition (2) is satisfied is configured such that the first laser beam is suitably converged on the data recording layer of the optical disc D1 with aberrations being substantially equal to zero. The third area 3 does not contribute to the formation of the beam spot for the second laser beam. Therefore, the third area 3 functions as an aperture stop for the second laser beam. More specifically, the third area 3 is configured such that the diffraction order at which the diffraction efficiency for the first laser beam is maximized in the third area 3 is different from the diffraction order at which the diffraction efficiency for the first laser beam is maximized in the second area 2. The third area 3 is blazed so that the diffraction efficiency for the first laser beam is maximized.

By forming the third area configured as mentioned above, each of the second and third laser beams is diffused by passing through the third area 3.

The third area 3 is configured as follows if a condition (3) indicated below is satisfied.

$$f1 \times NA1 < f2 \times NA2 \tag{3}$$

The diffracting structure formed in the third area 3 when the condition (3) is satisfied is configured such that the second laser beam is suitably converged on the data recording layer of the optical disc D2 with aberrations being substantially equal to zero. The third area 3 does not contribute to the formation of the beam spot for the first laser beam. Therefore, the third area 3 functions as an aperture stop for the first laser beam. More specifically, the third area 3 is configured such that the diffraction order at which the diffraction efficiency for the second laser beam is maximized in the third area 3 is different from the diffraction order at which the diffraction efficiency for the second laser beam is maximized in the second area 2. The third area 3 is blazed so that the diffraction efficiency for the second laser beam is maximized.

By forming the third area configured as mentioned above, each of the first and third laser beams is diffused by passing through the third area 3.

By thus configuring the first, second and third areas 1 to 3, beam spots suitable for recording data to and/or reproducing data from the optical disc D1, D2 and D3, respectively, are attained.

The optical pick-up 100 is configured to form suitable beam spots on the plurality of types of optical discs D1, D2 and D3, respectively even if the first laser beam and the third laser beam has a relationship which complicates the correction of aberration. The relationship complicating the correction of aberration is represented by the following relationship (4).

$$\lambda_1/(n_1-1):\lambda_3/(n_3-1) \cong 1:2 \tag{4}$$

In the above relationship (4), $\lambda_1$ represents the wavelength of the first laser beam, $n_1$ represents a refractive index of the objective lens 10 for the first laser beam, $\lambda_3$ represents the wavelength of the third laser beam, and $n_3$ represents a refractive index of the objective lens I 0 for the third laser beam.

If the relationship (4) holds, the spherical aberration is corrected (i.e., suitable beam spots are formed for the first to third laser beams, respectively) by inputting each of the first to third laser beams to the objective lens 10 as a collimated beam. Therefore, the optical pick-up 100 according to the embodiment is considered as an optical pick-up which is capable of forming suitable beam spots for a plurality of types of optical discs, respectively if the plurality of types of optical discs has the relationship (4).

Figure 5:
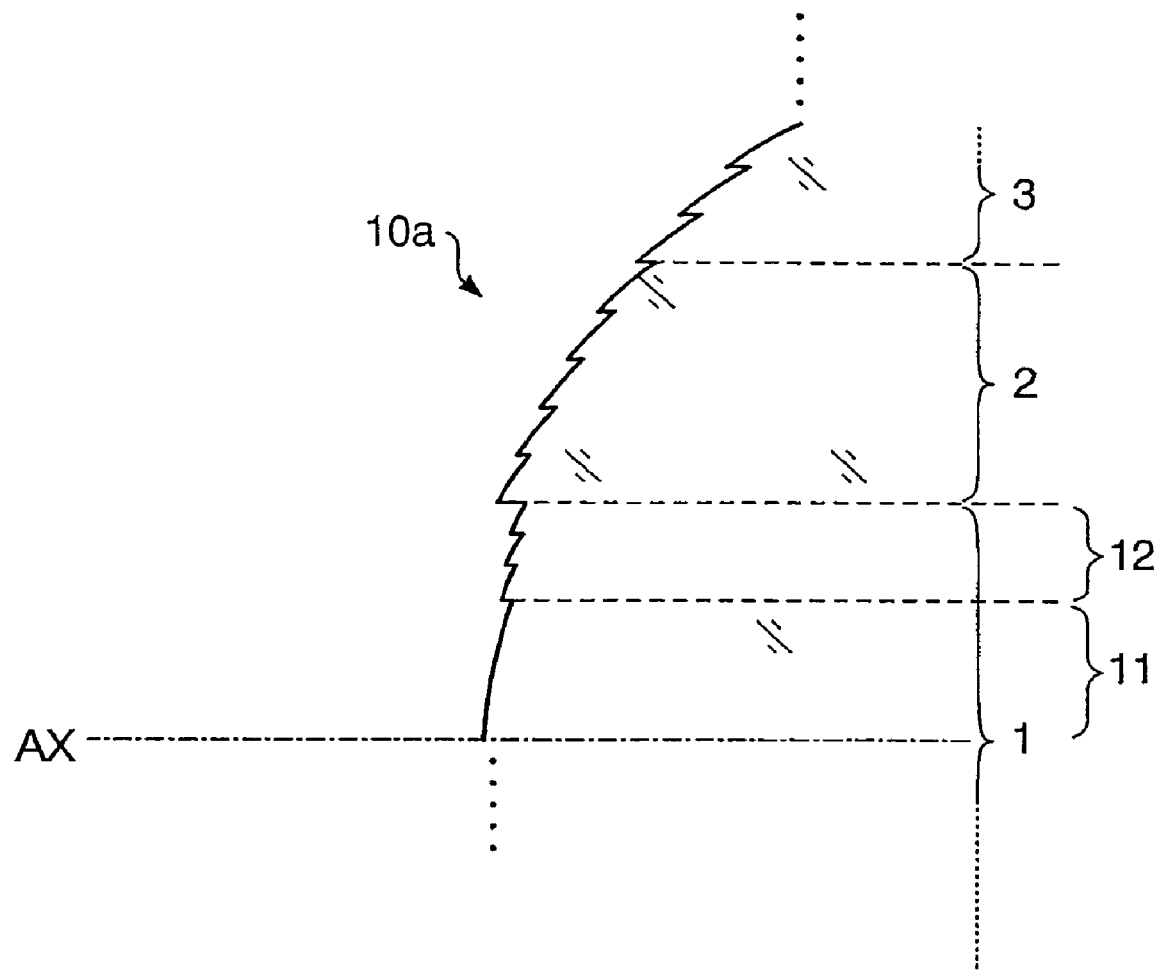
FIG. 5 is a cross-sectional view of the objective lens illustrating an example of the surface structure of the front surface of the objective lens.

FIG. 5 is a cross-sectional view of the objective lens 10 including the optical axis AX. FIG. 5 shows an example of the structure of the surface 10a of objective lens 10. As shown in FIG. 5, the surface 10a of the objective lens 10 includes the first, second and third areas 1, 2 and 3, and the diffracting structures are formed within the outer area 12, the second area 2 and the third area 3, respectively.

As described above, according to the embodiment, the off-axis aberrations (caused when the objective lens 10 is shifted in a direction perpendicular to the optical axis AX by a tracking operation) as well as the spherical aberration are sufficiently corrected when each of the existing optical discs and the new standard optical discs is used. That is, according to the embodiment, suitable beam spots are formed on the data recording layers of the optical discs D1, D2 and D3, respectively.

Hereafter, three concrete examples according to the embodiment will be explained. In the following examples, the thickness of the cover layers of the optical discs D1 and D2 are 0.6 mm, and the thickness of the cover layer of the optical disc D3 is 1.2 mm.

FIRST EXAMPLE

The optical pick-up 100 according to a first example has the configuration shown in FIGS. 1 and 2A to 2C. Performance specifications of the optical pick-up 100 and the objective lens 10 according to the first example are shown in Table 1.

TABLE 1

|  | First laser beam | Second laser beam | Third laser beam |
|---|---|---|---|
| Design wavelength (nm) | 405 | 657 | 788 |
| Focal length f (mm) | 3.000 | 3.099 | 3.118 |
| NA | 0.650 | 0.600 | 0.449 |
| magnification | 0.000 | 0.000 | 0.000 |

In Table 1 (and in the following similar Tables), the design wavelength is a wavelength suitable for the recording/reproducing operation of the optical disc, f represents a focal length (unit: mm) of the objective lens 10, NA represents the numerical aperture. In Table 1, the performance specifications are indicated with regard to each of the first laser beam (the optical disc D1), the second laser beam (the optical disc D2) and the third laser beam (the optical disc D3).

As can be seen from the values of the magnification in Table 1, each of the first to third laser beams is incident on the objective lens 10 as a collimated beam.

Table 2 shows a numerical configuration of the optical pick-up 100 when the optical disc D1 (the first laser beam) is used, Table 3 shows a numerical configuration of the optical pick-up 100 when the optical disc D2 (the second laser beam) is used, and Table 4 shows a numerical configuration of the optical pick-up 100 when the optical disc D3 (the third laser beam) is used. In the following Tables 2 to 4, numerical data regarding optical components located between the light source and the objective lens 10 is omitted for the sake of simplicity.

TABLE 2

| Surface Number | r | d | n (405 nm) | n (657 nm) | n (788 nm) |
|---|---|---|---|---|---|
| #0 |  | ∞ |  |  |  |
| #1 (inner area of 1st area) | 1.8900 | 2.30 | 1.52469 | 1.50645 | 1.50316 |
| #1 (outer area of 1st region) | 1.8953 |  |  |  |  |
| #1 (2nd area) | 1.8781 |  |  |  |  |
| #1 (3rd area) | 1.8868 |  |  |  |  |
| #2 | -5.4680 | 1.37 |  |  |  |
| #3 | ∞ | 0.60 | 1.62231 | 1.57982 | 1.57315 |
| #4 | ∞ | — |  |  |  |

TABLE 3

| Surface Number | r | d | n (405 nm) | n (657 nm) | n (788 nm) |
|---|---|---|---|---|---|
| #0 |  | ∞ |  |  |  |
| #1 (inner area of 1st area) | 1.8900 | 2.30 | 1.52469 | 1.50645 | 1.50316 |
| #1 (outer area of 1st region) | 1.8953 |  |  |  |  |
| #1 (2nd area) | 1.8781 |  |  |  |  |
| #1 (3rd area) | 1.8868 |  |  |  |  |
| #2 | -5.4680 | 1.45 |  |  |  |
| #3 | ∞ | 0.60 | 1.62231 | 1.57982 | 1.57315 |
| #4 | ∞ | — |  |  |  |

TABLE 4

| Surface Number | r | d | n (405 nm) | n (657 nm) | n (788 nm) |
|---|---|---|---|---|---|
| #0 |  | ∞ |  |  |  |
| #1 (inner area of 1st area) | 1.8900 | 2.30 | 1.52469 | 1.50645 | 1.50316 |
| #1 (outer area of 1st region) | 1.8953 |  |  |  |  |
| #1 (2nd area) | 1.8781 |  |  |  |  |
| #1 (3rd area) | 1.8868 |  |  |  |  |
| #2 | -5.4680 | 1.09 |  |  |  |
| #3 | ∞ | 1.20 | 1.62231 | 1.57982 | 1.57315 |
| #4 | ∞ | — |  |  |  |

In Tables 2-4 (and in the following similar Tables), "r" represents a radius of curvature (unit: mm) of each lens surface on the optical axis, "d" represents a thickness of a lens or a distance (unit: mm) from a lens surface to a next lens surface, and "n" represents a refractive index which is indicated for each of wavelengths of the first, second and third laser beams.

In Tables 2 to 4, "surface number" represents a surface number of each surface of optical components in the optical pick-up 100. In Tables 2 to 4 (and in the following similar Tables), a surface #0 represents the light source 101A, 101B and 101C, respectively, surfaces #1 and #2 represent the surface 10a and the surface 10b of the objective lens 10, respectively, and surfaces #3 and #4 represent the cover layer and the data recording layer of the optical disc, respectively.

In this example, f1×NA1 is 1.95 and f2×NA2 is 1.86. Therefore, in this example, the condition (2) is satisfied. The objective lens 10 according to the first example is provided with the third area 3 which is formed outside the second area 2. Each area formed on the surface 10a is defined as follows by the height h (mm) from the optical axis AX.

Inner area 11 of first area 1: h≦1.15

Outer area 12 of first area 1: 1.15<h≦1.40

Second area 2: 1.40<h≦1.86

Third area 3: 1.86<h≦1.95

As indicated above, in this example, h1a/h1 is 0.82. Therefore, in this example, the condition (1) is satisfied. As can be seen from the design wavelengths and refractive indexes show in Tables 1 to 4, $\lambda_1/(n_1-1):\lambda_3/(n_3-1)$ is about 1:2. Therefore, the condition (4) is also satisfied.

Each of the surfaces 10a and 10b of the objective lens 10 is an aspherical surface. The aspherical surface is expressed by a following equation:

$$X(h) = \frac{ch^2}{1+\sqrt{1-(1+K)c^2h^2}} + A_4h^4 + A_6h^6 + A_8h^8 + A_{10}h^{10} + A_{12}h^{12} + \ldots$$

where, X(h) represents a SAG amount which is a distance between a point on the aspherical surface at a height of h from the optical axis and a plane tangential to the aspherical surface at the optical axis, symbol c represents curvature (1/r) on the optical axis, K is a conical coefficient, and $A_4, A_6, A_8, A_{10}$ and $A_{12}$ are aspherical coefficients of fourth, sixth, eighth, tenth and twelfth orders, respectively.

Table 5 shows the conical coefficient and aspherical coefficients of the inner area 11, the outer area 12, the second area 2 and the third area 3 of the surface 10a (#1) and the surface 10b (#2) of the objective lens 10.

TABLE 5

| | #1 inner area 11 of 1st area | #1 outer area 12 of 1st area | #1 (2nd area) | #1 (3rd area) | #2 |
|---|---|---|---|---|---|
| | Surface No. | | | | |
| K | −0.65 | −0.6600 | −0.6500 | −0.6500 | 0.0000 |
| A4 | 2.4920E−03 | 3.2990E−03 | 1.0760E−03 | 1.0850E−03 | 2.9030E−02 |
| A6 | 2.9260E−04 | 4.1400E−04 | 2.0170E−05 | 7.4800E−05 | −8.4040E−03 |
| A8 | 5.1940E−05 | 3.3470E−05 | −6.2880E−05 | −2.8600E−05 | 2.6070E−03 |
| A10 | −7.6620E−06 | 1.1650E−05 | 1.6800E−05 | 1.0583E−05 | −5.1690E−04 |
| A12 | 4.0600E−06 | 0.0000E+00 | 6.9150E−07 | 1.5359E−06 | 4.4090E−05 |

In Table 5 (and in the following similar Tables), a notation symbol E indicates that 10 is used as a radix and a right side value of E is used as an exponent.

As shown in Table 5, the inner area 11, the outer area 12, the second area 2 and the third area 3 have different aspherical shapes.

At least a part of the areas on the surface 10a of the objective lens 10 is provided with a diffracting structure to obtain a suitable NA for each optical disc. In this example, the second and third areas 2 and 3 are provided with diffracting structures, respectively, and the outer area 12 is formed to be a refractive surface contributing to convergence of only the third laser beam.

The diffracting structure formed in each of the second and third areas 2 and 3 of the objective lens 10 is expressed by an optical path difference function $\Phi(h)$:

$$\Phi(h) = (P_2 h^2 + P_4 h^4 + P_6 h^6 + \ldots)m\lambda$$

where $P_2$, $P_4$ and $P_6$ are coefficients of second, fourth and sixth orders, h represents a height from the optical axis, m represents a diffraction order, and $\lambda$ represents a working wavelength. The optical path difference function $\Phi(h)$ indicates a difference of an optical path length of a hypothetical ray of light which does not pass through the diffractive lens structure and an optical path length of a ray of light which is diffracted by the diffraction lens structure, at the height h from the optical axis. In other words, the optical path difference function $\Phi(h)$ represents the additional optical path length of each ray of light which is diffracted by the diffractive lens structure. "m" represents the diffraction order at which the diffraction efficiency is maximized.

Table 6 shows values of the coefficients of the optical path difference function $\Phi(h)$ applied to the diffracting structures formed on the first surface 10a of the objective lens 10.

TABLE 6

| coefficient | #1 Second Area 2 | #1 Third Area 3 |
|---|---|---|
| P2 | 6.4606E−01 | 3.4586E−01 |
| P4 | −4.8760E−01 | −1.5210E+00 |
| P6 | −1.4300E−01 | −3.0890E−01 |
| P8 | 1.3510E−03 | 1.1650E−02 |
| P10 | 0.0000E+00 | 0.0000E+00 |
| P12 | 0.0000E+00 | 0.0000E+00 |

As described above, different diffraction orders m are assigned to the areas on which diffracting structures are formed, respectively. Table 7 shows the diffraction order m (at which the diffraction efficiency is maximized) in each of the second and third areas 2 and 3. In Table 7, the diffraction orders m are indicated for each of the first, second and third laser beams. As can be seen form Table 7, the diffracting structure in the second area 2 is configured to contribute to the convergence of the first and second laser beams, and the diffracting structure in the third area 3 is configured to contribute only to the convergence of the first laser beam. That is, the third area 3 functions as an aperture stop for the second laser beam.

TABLE 7

| m | First Laser | Second Laser | Third Laser |
|---|---|---|---|
| Second Area 2 | $3^{rd}$ | $2^{nd}$ | — |
| Third Area 3 | $1^{st}$ | — | — |

FIGS. 6A to 6C are graphs illustrating the spherical aberrations caused in the optical pick-up 100 according to the first example. FIG. 6A is a graph illustrating the spherical aberration caused when the first laser beam passes through the objective lens 10. FIG. 6B is a graph illustrating the spherical aberration caused when the second laser beam passes through the objective lens 10. FIG. 6C is a graph illustrating the spherical aberration caused when the third laser beam passes through the objective lens 10.

From the graphs of FIGS. 6A to 6C, the following conclusions are derived. That is, in the outer area 12 for securing the numerical aperture for the optical disc D3, the spherical aberration caused by the third laser beam is sufficiently corrected. In the second and third areas 2 and 3 for securing higher numerical apertures, the spherical aberrations caused by the first and second laser beams are sufficiently corrected. Therefore, according to the first example, the spherical aberration is sufficiently corrected for all of the optical discs D1 to D3. Suitable beam spots for the recording/reproducing operations for the optical discs D1 to D3 can be formed on the data recording layers of the optical discs D1 to D3, respectively.

Figure 7A:
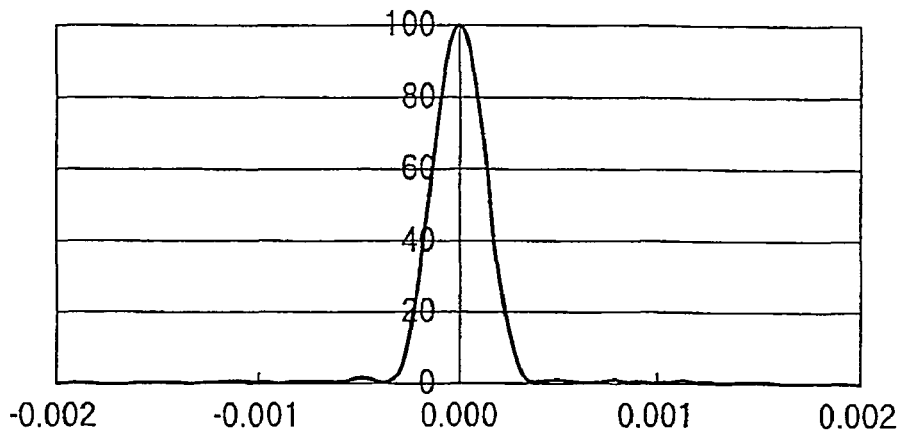
FIG. 7A is a graph illustrating the intensity of the first laser beam on the data recording layer of the first optical disc when the first optical disc is used in the first example.
Figure 7B:
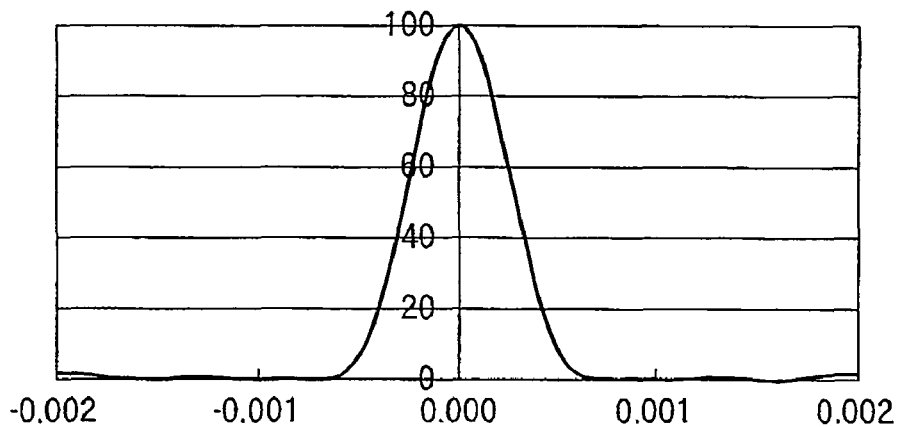
FIG. 7B is a graph illustrating the intensity of the second laser beam on the data recording layer of the second optical disc when the second optical disc is used in the first example.
Figure 7C:
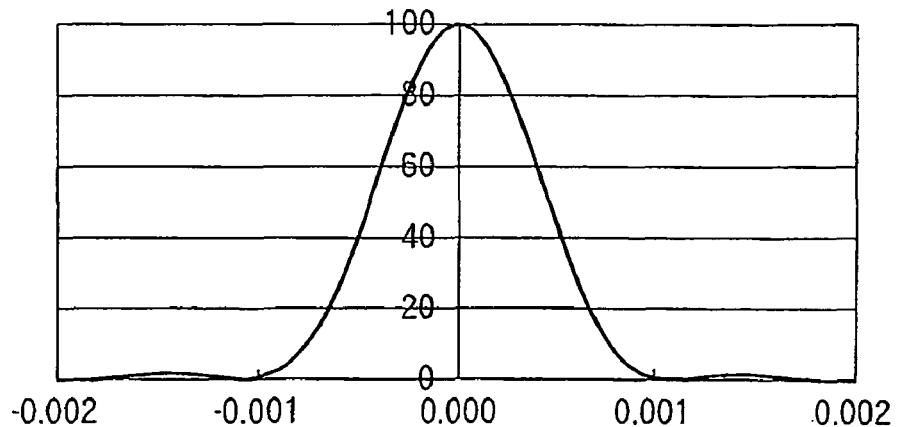
FIG. 7C is a graph illustrating the intensity of the third laser beam on the data recording layer of the third optical disc when the third optical disc is used in the first example.

FIGS. 7A to 7C are graphs illustrating the intensities of the beams on the data recording layers of the optical disc D1, D2 and D3, respectively. That is, FIGS. 7A to 7C respectively show the beam spots on the optical disc D1, D2 and D3 in the optical pick-up 100 according to the first example. FIG. 7A is a graph illustrating the intensity of the first laser beam on the data recording layer of the optical disc D1. FIG. 7B is a graph illustrating the intensity of the second laser beam on the data recording layer of the optical disc D2. FIG. 7C is a graph illustrating the intensity of the third laser beam on the data recording layer of the optical disc D3. In each of FIGS. 7A to 7C, the horizontal axis represents the size of the beam spot (unit: mm), and the vertical axis represents the relative intensity expressed as a percentage with respect to the intensity of the spot center.

Figure 8A:
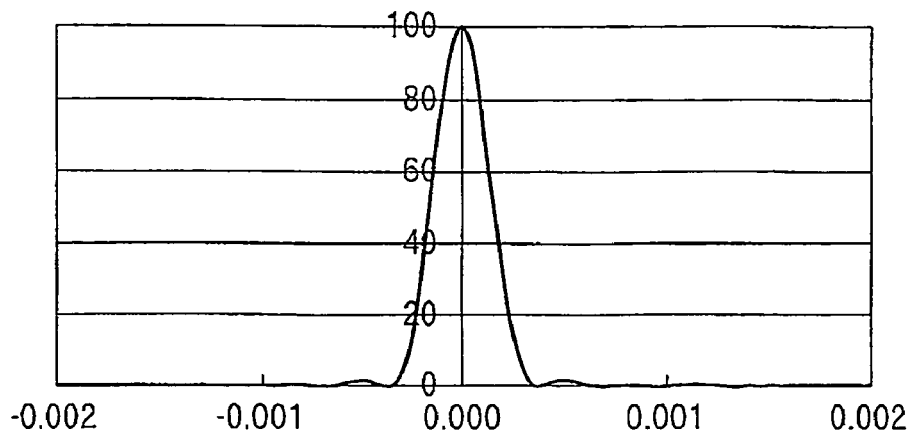
FIG. 8A is a graph illustrating the intensity of the first laser beam on the data recording layer of the first optical disc when an objective lens which has substantially the same configuration as that of the first example but is specifically designed for the first optical disc is used.
Figure 8B:
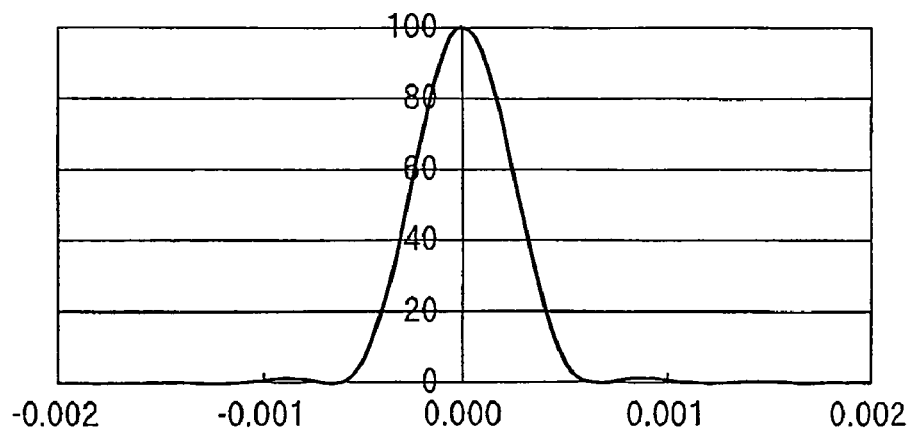
FIG. 8B is a graph illustrating the intensity of the second laser beam on the data recording layer of the second optical disc when an objective lens which has substantially the same configuration as that of the first example but is specifically designed for the second optical disc is used.
Figure 8C:
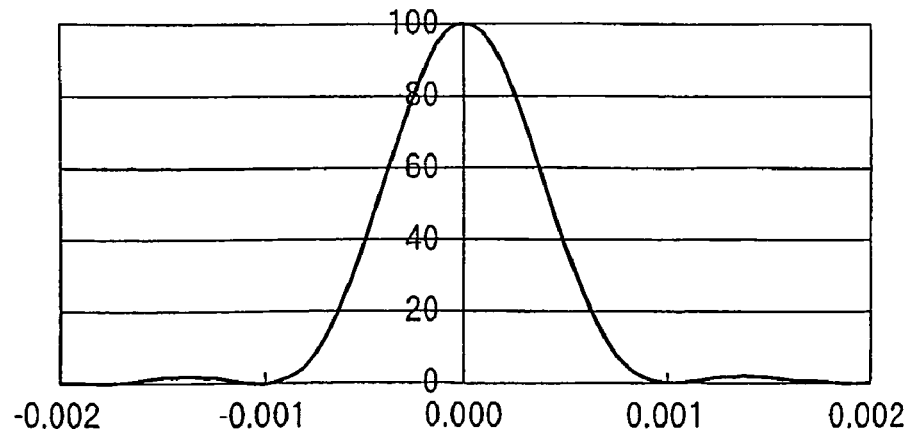
FIG. 8C is a graph illustrating the intensity of the third laser beam on the data recording layer of the third optical disc when an objective lens which has substantially the same configuration as that of the first example but is specifically designed for the third optical disc is used.

Hereafter, a first comparative example is explained. FIG. 8A is a graph illustrating the intensity of the first laser beam on the data recording layer of the optical disc D1 when an objective lens which has substantially the same configuration as that of the first example but is specifically designed for the optical disc D1 is used. FIG. 8B is a graph illustrating the intensity of the second laser beam on the data recording layer of the optical disc D2 when an objective lens which has substantially the same configuration as that of the first example but is specifically designed for the optical disc D2 is used. FIG. 8C is a graph illustrating the intensity of the third laser beam on the data recording layer of the optical disc D3 when an objective lens which has substantially the same configuration as that of the first example but is specifically designed for the optical disc D3 is used. In each of FIGS. 8A to 8C, the horizontal axis represents the size of the beam spot (unit: mm), and the vertical axis represents the relative intensity expressed as a percentage with respect to the intensity of the spot center.

Table 8 shows a spot size at the relative intensity of 13.5% for each of the cases of FIGS. 7A to 7C and 8A to 8C. That is, in Table 8, the spot size provided by the objective lens 10 according to the first example and the spot size provided by the objective lens according to the first comparative example are shown for each of the first, second and third laser beams.

TABLE 8

|  | first laser beam | Second Laser Beam | Third Laser Beam |
| --- | --- | --- | --- |
| First Example | 0.51 | 0.91 | 1.44 |
| 1st Comparative Example | 0.51 | 0.90 | 1.44 |

As shown in FIGS. 7A to 7C and 8A to 8C and Table 8, the objective lens 10 according to the first example is capable of forming beam spots suitable for the optical discs D1, D2 and D3, respectively. The objective lens 10 attains the beam spot size and the beam intensity substantially equal to the beam spot size and the beam intensity attained by the objective lens specifically designed for the optical disc D1, the beam spot size and the beam intensity substantially equal to the beam spot size and the beam intensity attained by the objective lens specifically designed for the optical disc D2, and the beam spot size and the beam intensity substantially equal to the beam spot size and the beam intensity attained by the objective lens specifically designed for the optical disc D3. It should be noted that according to the first example such excellent performance is provided by the objective lens 10 which is formed as a single element lens.

SECOND EXAMPLE

The optical pick-up 100 according to a second example has the configuration shown in FIGS. 1 and 2A to 2C. Performance specifications of the optical pick-up 100 and the objective lens 10 according to the second example are shown in Table 9.

TABLE 9

|  | First laser beam | Second laser beam | Third laser beam |
| --- | --- | --- | --- |
| Design wavelength (nm) | 405 | 657 | 788 |
| Focal length f (mm) | 3.000 | 3.099 | 3.118 |
| NA | 0.650 | 0.629 | 0.468 |
| magnification | 0.000 | 0.000 | 0.000 |

As can be seen from the values of the magnification in Table 9, each of the first to third laser beams is incident on the objective lens 10 as a collimated beam.

Table 10 shows a numerical configuration of the optical pick-up 100 when the optical disc D1 (the first laser beam) is used, Table 11 shows a numerical configuration of the optical pick-up 100 when the optical disc D2 (the second laser beam) is used, and Table 12 shows a numerical configuration of the optical pick-up 100 when the optical disc D3 (the third laser beam) is used. In the following Tables 10 to 12, numerical data regarding optical components located between the light source and the objective lens 10 is omitted for the sake of simplicity.

TABLE 10

| Surface Number | r | d | n (405 nm) | n (657 nm) | n (788 nm) |
| --- | --- | --- | --- | --- | --- |
| #0 |  | ∞ |  |  |  |
| #1 (inner area of 1st area) | 1.8900 | 2.30 | 1.52469 | 1.50645 | 1.50316 |
| #1 (outer area of 1st region) | 1.8647 |  |  |  |  |
| #1 (2nd area) | 1.8781 |  |  |  |  |
| #2 | −5.4680 | 1.37 |  |  |  |
| #3 | ∞ | 0.60 | 1.62231 | 1.57982 | 1.57315 |
| #4 | ∞ | — |  |  |  |

TABLE 11

| Surface Number | r | d | n (405 nm) | n (657 nm) | n (788 nm) |
| --- | --- | --- | --- | --- | --- |
| #0 |  | ∞ |  |  |  |
| #1 (inner area of 1st area) | 1.8900 | 2.30 | 1.52469 | 1.50645 | 1.50316 |
| #1 (outer area of 1st region) | 1.8647 |  |  |  |  |
| #1 (2nd area) | 1.8781 |  |  |  |  |
| #2 | −5.4680 | 1.45 |  |  |  |
| #3 | ∞ | 0.60 | 1.62231 | 1.57982 | 1.57315 |
| #4 | ∞ | — |  |  |  |

TABLE 12

| Surface Number | r | d | n (405 nm) | n (657 nm) | n (788 nm) |
| --- | --- | --- | --- | --- | --- |
| #0 |  | ∞ |  |  |  |
| #1 (inner area of 1st area) | 1.8900 | 2.30 | 1.52469 | 1.50645 | 1.50316 |
| #1 (outer area of 1st region) | 1.8647 |  |  |  |  |

TABLE 12-continued

| Surface Number | r | d | n (405 nm) | n (657 nm) | n (788 nm) |
|---|---|---|---|---|---|
| #1 (2nd area) | 1.8781 | | | | |
| #2 | −5.4680 | 1.09 | | | |
| #3 | ∞ | 1.20 | 1.62231 | 1.57982 | 1.57315 |
| #4 | ∞ | — | | | |

In Tables 10-12, "surface number" represents a surface number of each surface of optical components in the optical pick-up 100.

In this example, f1×NA1 is 1.95 and f2×NA2 is 1.95. Therefore, the objective lens 10 according to the second example is not an objective lens satisfying the conditions (2) and (3). Therefore, the objective lens 10 according to the second example is not provided with the third area 3. Each area formed on the surface 10a is defined as follows by the height h (mm) from the optical axis AX.

Inner area 11 of first area 1: h≦1.20

Outer area 12 of first area 1: 1.20<h≦1.46

Second area 2: 1.46<h≦1.95

As indicated above, in this example, h1a/h1 is 0.82. Therefore, the condition (1) is satisfied. As can be seen from the design wavelengths and refractive indexes show in Tables 9 to 12, $\lambda_1/(n_1-1):\lambda_3/(n_3-1)$ is about 1:2. Therefore, the condition (4) is also satisfied.

Each of the surfaces 10a and 10b of the objective lens 10 is an aspherical surface. Table 13 shows the conical coefficient and aspherical coefficients of the inner area 11, the outer area 12, and the second area 2 of the surface 10a (#1) and the surface 10b (#2) of the objective lens 10.

TABLE 13

| Surface No. | #1 inner area 11 of 1st area | #1 outer area 12 of 1st area | #1 (2nd area) | #2 |
|---|---|---|---|---|
| K | −0.6500 | −0.6600 | −0.6500 | 0.0000 |
| A4 | 2.4920E−03 | −2.7000E−04 | 1.0870E−03 | 2.9030E−02 |
| A6 | 2.9260E−04 | −1.3490E−04 | 1.1940E−05 | −8.4040E−03 |
| A8 | 5.1940E−05 | 1.7040E−05 | −6.0960E−05 | 2.6070E−03 |
| A10 | −7.6620E−06 | −4.3340E−06 | 1.6610E−05 | −5.1960E−04 |
| A12 | 4.0600E−06 | 2.4505E−06 | 7.0569E−07 | 4.4090E−05 |

As shown in Table 13, the inner area 11, the outer area 12, and the second area 2 have different aspherical shapes.

At least a part of the areas of the surface 10a of the objective lens 10 is provided with a diffracting structure to obtain a suitable NA for each optical disc. In this example, the outer area 12 and the second area 2 are provided with diffracting structures, respectively, so that numerical apertures suitable for the optical discs D1 to D3 are attained and that each laser beam is suitably converged on the data recording layer of the corresponding optical disc.

In this example, the inner area 11 is formed to be a refractive surface contributing to convergence of all of the first to third laser beams.

Table 14 shows values of the coefficients of the optical path difference function Φ(h) applied to the diffracting structure formed on the surface 10a of the objective lens 10.

TABLE 14

| coefficient | #1 Outer Area 12 | #1 Second Area 2 |
|---|---|---|
| P2 | 2.7669E+00 | 6.4608E−01 |
| P4 | −2.2040E+00 | −4.8440E−01 |
| P6 | −2.3790E−01 | −1.4510E−01 |
| P8 | 0.0000E+00 | 1.6820E−03 |
| P10 | 0.0000E+00 | 0.0000E+00 |
| P12 | 0.0000E+00 | 0.0000E+00 |

Table 15 shows the diffraction order m (at which the diffraction efficiency is maximized) in each of the outer area 11 and second area 2. In Table 15, the diffraction orders m are indicated for each of the first, second and third laser beams. As can be seen from Table 15, the diffracting structure in the outer area 12 is configured to contribute to the convergence of the second and third laser beams, and the diffracting structure in the second area 2 is configured to contribute to the convergence of the first and second laser beams.

Although in Table 15 it is shown that the diffraction order at which the diffraction efficiency is maximized for the first laser beam is the first order, this does not mean that the first order diffracted light of the first laser beam is converged by the outer area 12 but means that the first order diffracted light of the first laser beam is generated by the outer area 12.

By forming the diffracting structure on the outer area 12, the loss of the light amount caused when the optical disc D2 (the second laser beam) is used is prevented. Consequently, the accurate recording/reproducing operation is secured for the optical disc D2.

TABLE 15

| m | First Laser | Second Laser | Third Laser |
|---|---|---|---|
| Outer Area 12 | $1^{st}$ | $1^{st}$ | $1^{st}$ |
| Second Area 2 | $3^{rd}$ | $2^{nd}$ | — |

FIGS. 9A to 9C are graphs illustrating the spherical aberrations caused in the optical pick-up 100 according to the second example. FIG. 9A is a graph illustrating the spherical aberration caused when the first laser beam passes through the objective lens 10. FIG. 9B. is a graph illustrating the spherical aberration caused when the second laser beam passes through the objective lens 10. FIG. 9C is a graph illustrating the spherical aberration caused when the third laser beam passes through the objective lens 10.

From the graphs of FIGS. 9A to 9C, the following conclusions are derived. That is, in the outer area 12 for securing the numerical aperture for the optical disc D3, the spherical aberration caused by the third laser beam is sufficiently corrected. In the second area 2 for securing the higher numerical aperture, the spherical aberrations caused by the first and second laser beams are sufficiently corrected. Therefore, according to the second example, the spherical aberration is sufficiently corrected for all of the optical discs D1 to D3. Suitable beam spots for the recording/reproducing operations for the optical discs D1 to D3 can be formed on the data recording layers of the optical discs D1 to D3, respectively.

Figure 10A:
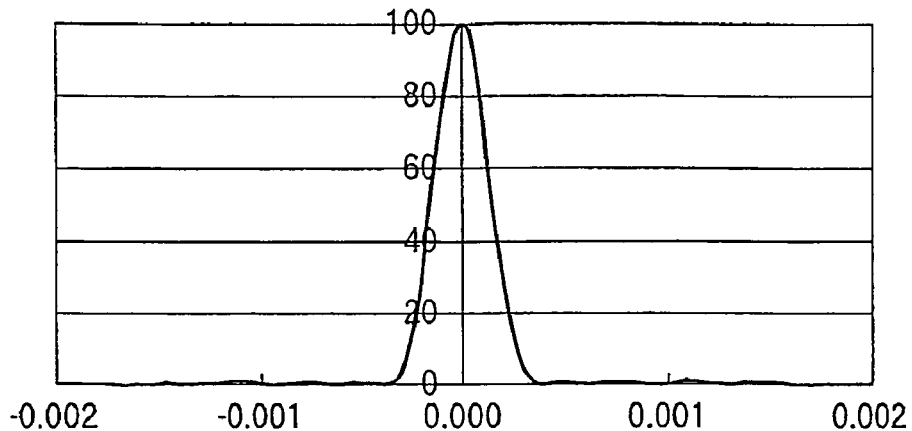
FIG. 10A is a graph illustrating the intensity of the first laser beam on the data recording layer of the first optical disc when the first optical disc is used in the second example.
Figure 10B:
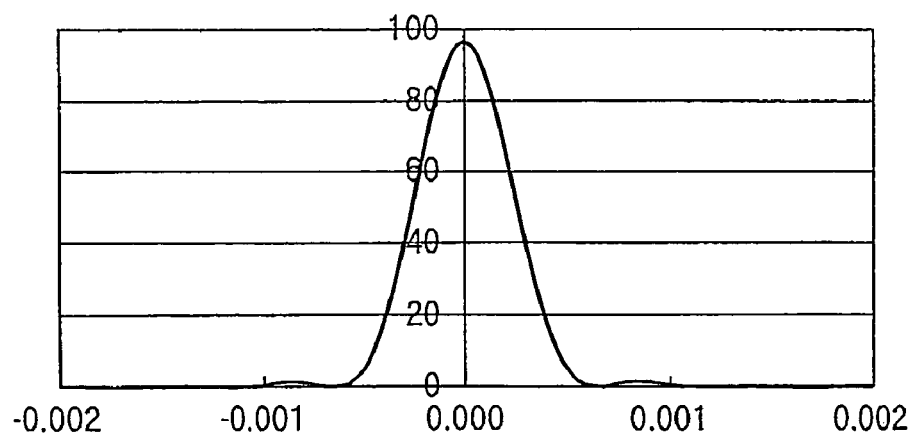
FIG. 10B is a graph illustrating the intensity of the second laser beam on the data recording layer of the second optical disc when the second optical disc is used in the second example.
Figure 10C:
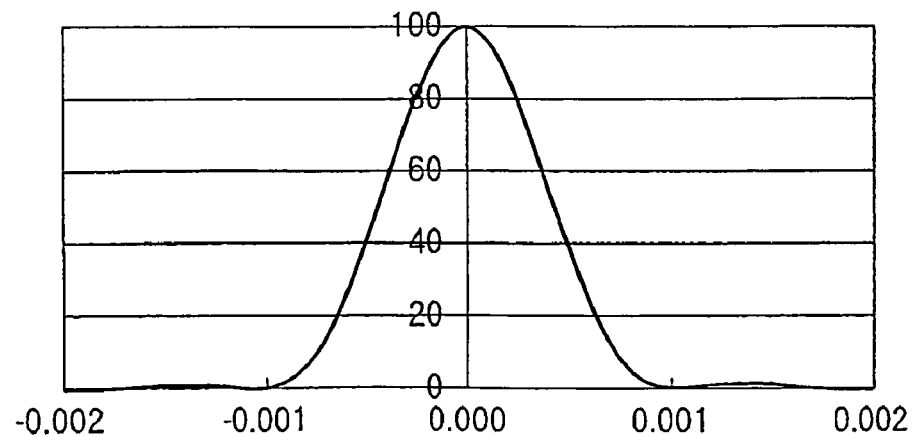
FIG. 10C is a graph illustrating the intensity of the third laser beam on the data recording layer of the third optical disc when the third optical disc is used in the second example.

FIGS. 10A to 10C are graphs illustrating the intensities of the beams on the data recording layers of the optical disc D1, D2 and D3, respectively. That is, FIGS. 10A to 10C respectively show the beam spots on the optical discs D1, D2 and D3 in the optical pick-up according to the second example. FIG. 10A is a graph illustrating the intensity of the first laser beam on the data recording layer of the optical disc D1. FIG. 10B is a graph illustrating the intensity of the second laser beam on the data recording layer of the optical disc D2. FIG. 10C is a graph illustrating the intensity of the third laser beam on the data recording layer of the optical disc D3. In each of FIGS. 10A to 10C, the horizontal axis represents the size of the beam spot (unit: mm), and the vertical axis represents the relative intensity expressed as a percentage with respect to the intensity of the spot center.

Figure 11A:
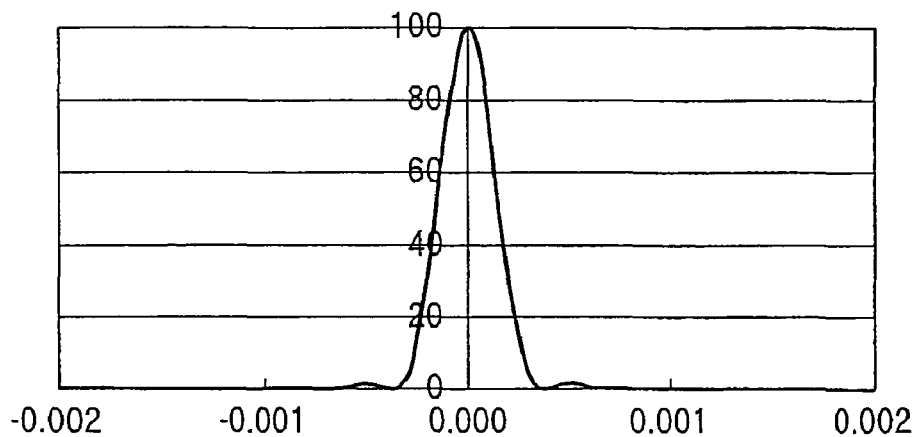
FIG. 11A is a graph illustrating the intensity of the first laser beam on the data recording layer of the first optical disc when an objective lens which has substantially the same configuration as that of the second example but is specifically designed for the first optical disc is used.
Figure 11B:
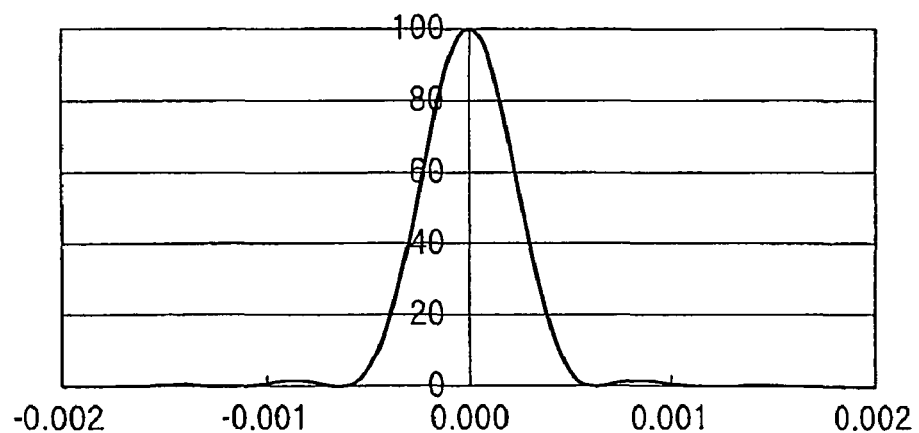
FIG. 11B is a graph illustrating the intensity of the second laser beam on the data recording layer of the second optical disc when an objective lens which has substantially the same configuration as that of the second example but is specifically designed for the second optical disc is used.
Figure 11C:
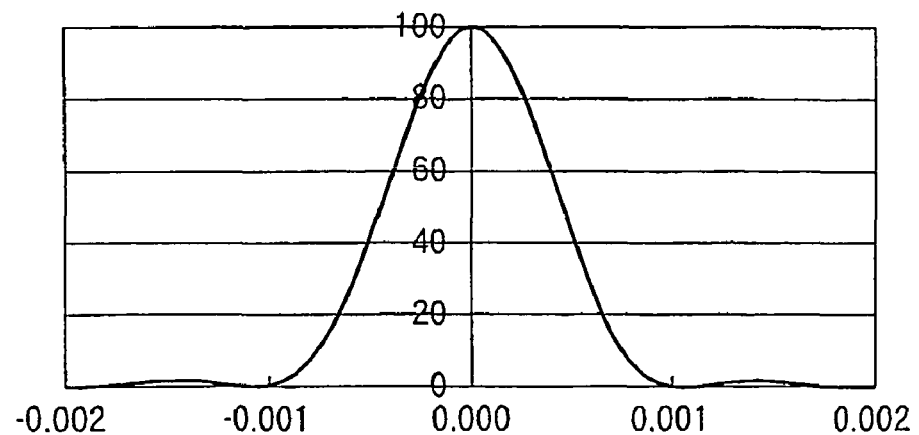
FIG. 11C is a graph illustrating the intensity of the third laser beam on the data recording layer of the third optical disc when an objective lens which has substantially the same configuration as that of the second example but is specifically designed for the third optical disc is used.

Hereafter, a second comparative example is explained. FIG. 11A is a graph illustrating the intensity of the first laser beam on the data recording layer of the optical disc D1 when an objective lens which has substantially the same configuration as that of the second example but is specifically designed for the optical disc D1 is used. FIG. 11B is a graph illustrating the intensity of the second laser beam on the data recording layer of the optical disc D2 when an objective lens which has substantially the same configuration as that of the second example but is specifically designed for the optical disc D2 is used. FIG. 11C is a graph illustrating the intensity of the third laser beam on the data recording layer of the optical disc D3 when an objective lens which has substantially the same configuration as that of the second example but is specifically designed for the optical disc D3 is used. In each of FIGS. 11A to 11C, the horizontal axis represents the size of the beam spot (unit: mm), and the vertical axis represents the relative intensity expressed as a percentage with respect to the intensity of the spot center.

Table 16 shows a spot size at the relative intensity of 13.5% for each of the cases of FIGS. 10A to 10C and 11A to 11C. That is, in Table 16, the spot size provided by the second example and the spot size provided by the second comparative example are shown for each of the first, second and third laser beams.

TABLE 16

|  | first laser beam | Second Laser Beam | Third Laser Beam |
| --- | --- | --- | --- |
| Second Example | 0.51 | 0.87 | 1.39 |
| 2nd Comparative Example | 0.51 | 0.86 | 1.38 |

As shown in FIGS. 10A to 10C and 11A to 11C and Table 16, the objective lens 10 according to the second example is capable of forming beam spots suitable for the optical discs D1, D2 and D3, respectively. The objective lens 10 attains the beam spot size and the beam intensity substantially equal to the beam spot size and the beam intensity attained by the objective lens specifically designed for the optical disc D1, the beam spot size and the beam intensity substantially equal to the beam spot size and the beam intensity attained by the objective lens specifically designed for the optical disc D2, and the beam spot size and the beam intensity substantially equal to the beam spot size and the beam intensity attained by the objective lens specifically designed for the optical disc D3. It should be noted that such excellent performance is provided by the objective lens 10 which is formed as a single element lens.

THIRD EXAMPLE

Hereafter, the optical pick-up 100 according to a third example will be described. Since the optical pick-up according to the second example and the optical pick-up according to the third example are identical except for surface shapes of the objective lens 10, the specifications of the objective lens 10 and the numerical configurations shown in Tables 9 to 12 are also applied to the third example.

The objective lens 10 according to the third example has the specifications shown in Table 9. Therefore, the objective lens 10 according to the third example does not satisfy the conditions (2) and (3). Therefore, the objective lens 10 according to the third example is not provided with the third area 3. Each area formed on the surface 10a is defined as follows by the height h (mm) from the optical axis AX.

Inner area 11 of first area 1: $h \leq 1.11$
Outer area 12 of first area 1: $1.11 < h \leq 1.46$
Second area 2: $1.46 < h \leq 1.95$ As indicated above, in this example, h1a/h1 is 0.76. Therefore, the condition (1) is satisfied. Similarly to the second example, $\lambda_1/(n_1-1):\lambda_3/(n_3-1)$ is about 1:2. Therefore, in this example, the condition (4) is satisfied.

Each of the surfaces 10a and 10b of the objective lens 10 is an aspherical surface. Table 17 shows the conical coefficient and aspherical coefficients of the inner area 11, the outer area 12, and the second area 2 of the surface 10a (#1) and the surface 10b (#2) of the objective lens 10. As shown in Table 17, the inner area 11, the outer area 12, and the second area 2 have different aspherical shapes.

TABLE 17

| Surface No. | #1 inner area 11 of $1^{st}$ area | #1 outer area 12 of 1st area | #1 (2nd area) | #2 |
| --- | --- | --- | --- | --- |
| K | −0.6500 | −0.6500 | −0.6500 | 0.0000 |
| A4 | 2.4650E−03 | −5.1310E−04 | 1.0750E−03 | 2.8810E−02 |
| A6 | 2.8700E−04 | −1.0720E−04 | 9.7800E−06 | −8.3370E−03 |
| A8 | 4.8520E−05 | −3.2560E−05 | −6.7160E−05 | 2.5910E−03 |
| A10 | −5.4860E−06 | 1.3608E−05 | 1.8064E−05 | −5.1515E−04 |
| A12 | 3.3461E−06 | −2.1510E−07 | 5.0900E−07 | 4.4081E−05 |

In this example, the outer area 12 and the second area 2 are provided with diffracting structures, respectively, so that numerical apertures suitable for the optical discs D1 to D3 are attained and that each laser beam is suitably converged on the data recording layer of the corresponding optical disc. In this example, the inner area 11 is formed to be a refractive surface contributing to convergence of all of the first to third laser beams.

Table 18 shows values of the coefficients of the optical path difference function Φ(h) applied to the diffracting structure formed on the surface 10a of the objective lens 10.

TABLE 18

| coefficient | #1 Outer Area 12 | #1 Second Area 2 |
| --- | --- | --- |
| P2 | 2.7669E+00 | 6.4609E−01 |
| P4 | −2.2040E+00 | −4.7680E−01 |
| P6 | −2.3820E−01 | −1.4680E−01 |
| P8 | 0.0000E+00 | 1.6700E−03 |
| P10 | 0.0000E+00 | 0.0000E+00 |
| P12 | 0.0000E+00 | 0.0000E+00 |

Table 19 shows the diffraction order m (at which the diffraction efficiency is maximized) in each of the outer area 11 and second area 2. In Table 19, the diffraction orders m are indicated for each of the first, second and third laser beams. As can be seen from Table 19, the diffracting structure in the outer area 12 is configured to contribute to the convergence of the second and third laser beams, and the diffracting structure in the second area 2 is configured to contribute to the convergence of the first and second laser beams.

Although in Table 19 it is shown that the diffraction order at which the diffraction efficiency is maximized for the first laser beam passing through the outer area 12 is the first order, this does not mean that the first order diffracted light of the first laser beam is converged by the outer area 12 but means that the first order diffracted light of the first laser beam is generated by the outer area 12.

TABLE 19

| m | First Laser | Second Laser | Third Laser |
|---|---|---|---|
| Outer Area 12 | $1^{st}$ | $1^{st}$ | $1^{st}$ |
| Second Area 2 | $3^{rd}$ | $2^{nd}$ | — |

FIGS. 11A to 11C are graphs illustrating the spherical aberrations caused in the optical pick-up 100 according to the third example. FIG. 11A is a graph illustrating the spherical aberration caused when the first laser beam passes through the objective lens 10. FIG. 11B is a graph illustrating the spherical aberration caused when the second laser beam passes through the objective lens 10. FIG. 11C is a graph illustrating the spherical aberration caused when the third laser beam passes through the objective lens 10.

From the graphs of FIGS. 11 A to 11C, the following conclusions are derived. That is, in the outer area 12 for securing the numerical aperture for the optical disc D3, the spherical aberration caused by the third laser beam is sufficiently corrected. In the second area 2 for securing the higher numerical aperture, the spherical aberrations caused by the first and second laser beams are sufficiently corrected. Therefore, according to the third example, the spherical aberration is sufficiently corrected for all of the optical discs D1 to D3. Suitable beam spots for the recording/reproducing operations for the optical discs D1 to D3 can be formed on the data recording layers of the optical discs D1 to D3, respectively.

Figure 12A:
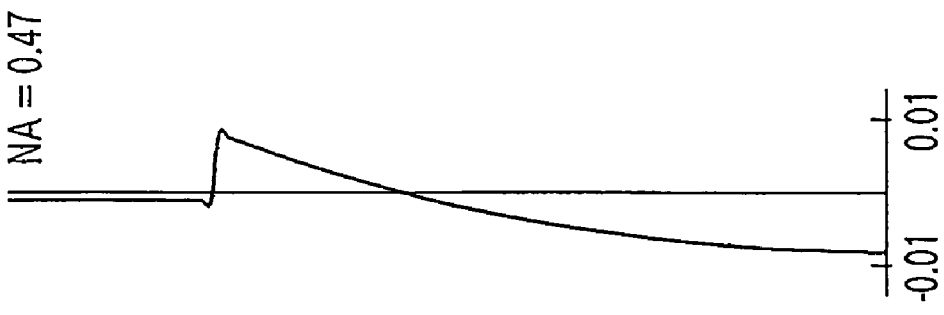
FIG. 12A is a graph illustrating a spherical aberration caused when the first laser beam passes through the objective lens according to a third example.
Figure 12B:
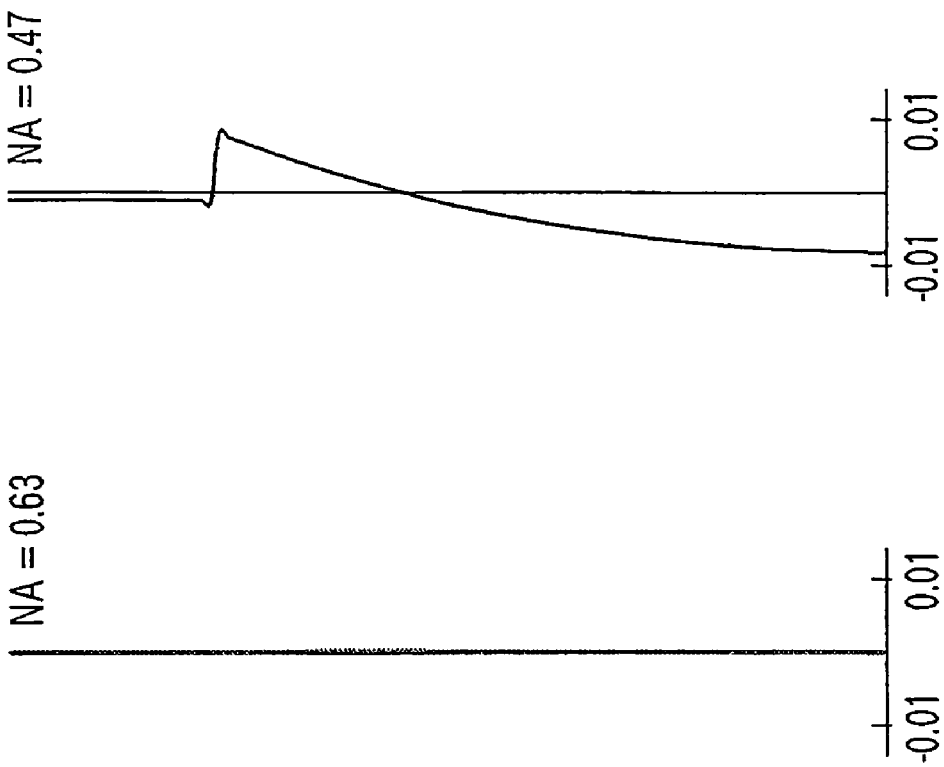
FIG. 12B is a graph illustrating a spherical aberration caused when the second laser beam passes through the objective lens according to the third example.
Figure 12C:
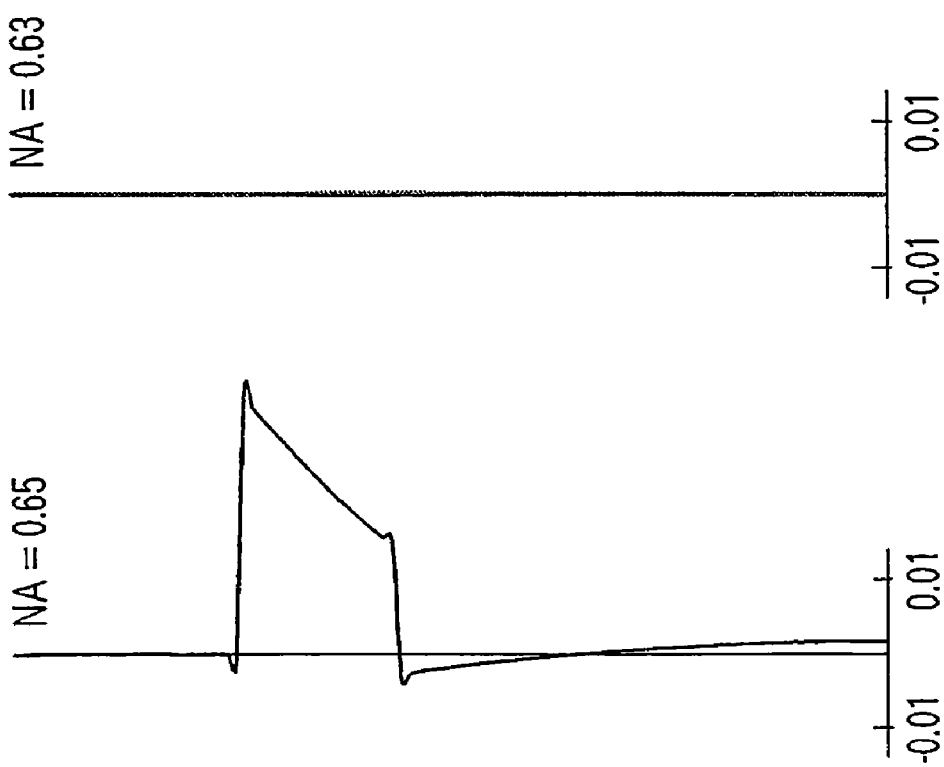
FIG. 12C is a graph illustrating a spherical aberration caused when the third laser beam passes through the objective lens according to the third example.

FIGS. 12A to 12C are graphs illustrating the intensities of the beams on the data recording layers of the optical disc D1, D2 and D3, respectively. That is, FIGS. 12A to 12C respectively show the beam spots on the optical discs D1, D2 and D3 in the optical pick-up according to the third example. FIG. 12A is a graph illustrating the intensity of the first laser beam on the data recording layer of the optical disc D1. FIG. 12B is a graph illustrating the intensity of the second laser beam on the data recording layer of the optical disc D2. FIG. 12C is a graph illustrating the intensity of the third laser beam on the data recording layer of the optical disc D3. In each of FIGS. 12A to 12C, the horizontal axis represents the size of the beam spot (unit: mm), and the vertical axis represents the relative intensity expressed as a percentage with respect to the intensity of the spot center.

Figure 13A:
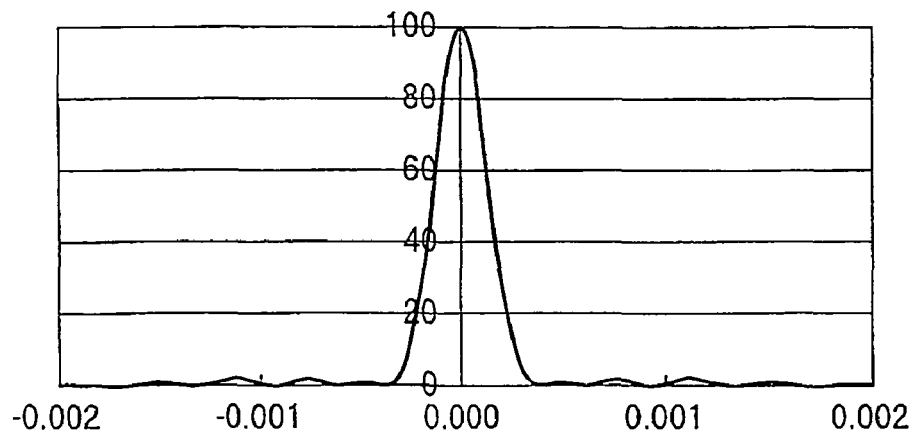
FIG. 13A is a graph illustrating the intensity of the first laser beam on the data recording layer of the first optical disc when the first optical disc is used in the third example.
Figure 13B:
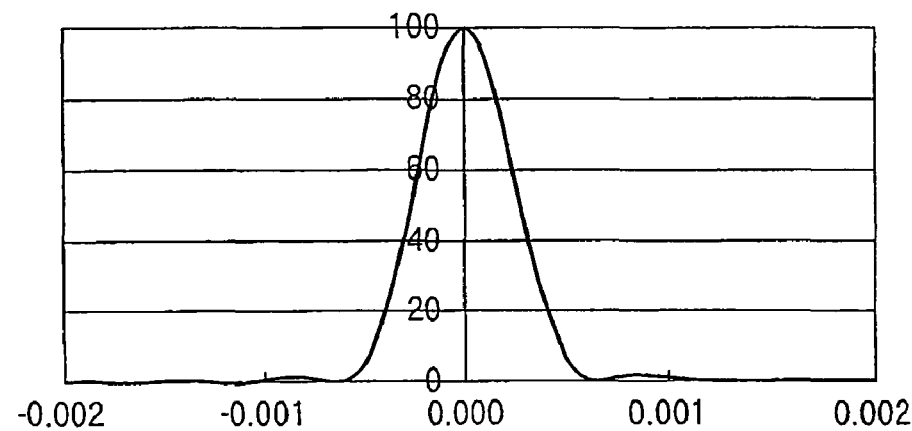
FIG. 13B is a graph illustrating the intensity of the second laser beam on the data recording layer of the second optical disc when the second optical disc is used in the third example.
Figure 13C:
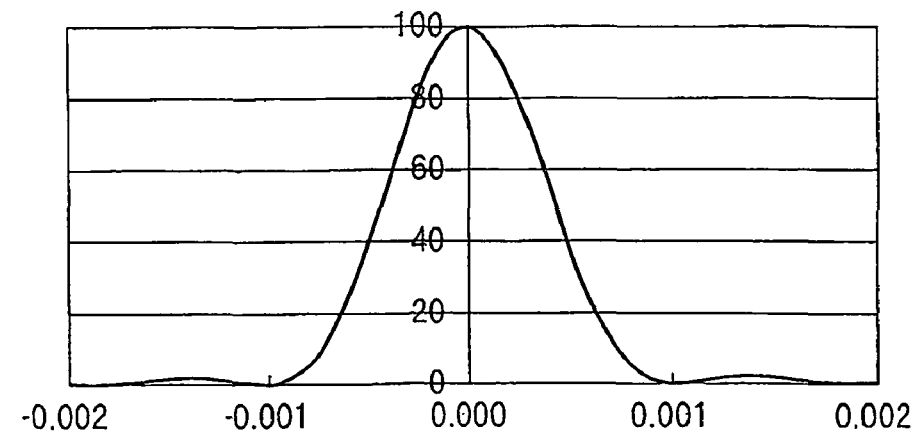
FIG. 13C is a graph illustrating the intensity of the third laser beam on the data recording layer of the third optical disc when the third optical disc is used in the third example.

Hereafter, a third comparative example is explained. FIG. 13A is a graph illustrating the intensity of the first laser beam on the data recording layer of the optical disc D1 when an objective lens which has substantially the same configuration as that of the third example but is specifically designed for the optical disc D1 is used. FIG. 13B is a graph illustrating the intensity of the second laser beam on the data recording layer of the optical disc D2 when an objective lens which has substantially the same configuration as that of the third example but is specifically designed for the optical disc D2 is used. FIG. 13C is a graph illustrating the intensity of the third laser beam on the data recording layer of the optical disc D3 when an objective lens which has substantially the same configuration as that of the third example but is specifically designed for the optical disc D3 is used. In each of FIGS. 13A to 13C, the horizontal axis represents the size of the beam spot (unit: mm), and the vertical axis represents the relative intensity expressed as a percentage with respect to the intensity of the spot center.

Table 20 shows a spot size at the relative intensity of 13.5% for each of the cases of FIGS. 12A to 12C and 13A to 13C. That is, in Table 20, the spot size provided by the third example and the spot size provided by the third comparative example are shown for each of the first, second and third laser beams.

TABLE 20

|  | first laser beam | Second Laser Beam | Third Laser Beam |
|---|---|---|---|
| Third Example | 0.50 | 0.87 | 1.37 |
| 3rd Comparative Example | 0.51 | 0.86 | 1.38 |

As shown in FIGS. 12A to 12C and 13A to 13C and Table 20, the objective lens 10 according to the third example is capable of forming beam spots suitable for the optical discs D1, D2 and D3, respectively. The objective lens 10 attains the beam spot size and the beam intensity substantially equal to the beam spot size and the beam intensity attained by the objective lens specifically designed for the optical disc D1, the beam spot size and the beam intensity substantially equal to the beam spot size and the beam intensity attained by the objective lens specifically designed for the optical disc D2, and the beam spot size and the beam intensity substantially equal to the beam spot size and the beam intensity attained by the objective lens specifically designed for the optical disc D3. It should be noted that such excellent performance is provided by the objective lens 10 which is formed as a single element lens.

Although the present invention has been described in considerable detail with reference to certain preferred embodiments thereof, other embodiments are possible.

Although, in the above mentioned embodiment, the diffracting structure is formed on the surface 10a of the objective lens 10, the diffracting structure may be formed on the surface 10b. The diffracting structure may be formed on each of the surface 10a and 10b.

What is claimed is:

1. An objective lens for an optical pick-up which is used to record data to and/or to reproduce data from at least three types of optical discs by selectively using one of at least three light beams having different wavelengths, the at least three types of optical discs having at least two different thicknesses of cover layers, when a thickness of a first optical disc of the at least three types of optical discs to be used for recording data and/or reproducing data using a first light beam of the at least three light beams having a wavelength shortest of all the wavelengths of the at least three light beams is represented by t1, a thickness of a second optical disc of the at least three types of optical discs to be used for recording data and/or reproducing data using a second light beam of the at least three light beams having a wavelength longer than that of the first light beam is represented by t2, and a thickness of a third optical disc of the at least three types of optical discs to be used for recording data and/or reproducing data using a third light beam of the at least three light beams having a wavelength longest of all of the wavelengths of the at least three light beams is represented by t3, a relationship $t1 \leq t2 < t3$ being satisfied, when a numerical aperture required for recording data to and/or reproducing data from the first optical disc is represented by NA1, a numerical aperture required for recording data to and/or reproducing data from the second optical disc is represented by NA2, and a numerical aperture required for recording data to and/or reproducing data from the third optical disc is represented by NA3, a relationship NA1≧NA2>NA3 being satisfied, the first, second and third light beams being incident on the objective lens as substantially collimated light beams, respectively, such that an amount of aberration caused during a tracking operation where the objective lens is shifted in a direction perpendicular to an optical axis direction of the objective lens, is corrected, wherein at least one of surfaces of the objective lens includes:

a first area for attaining the numerical aperture required for recording data to and/or reproducing data from the third optical disc; and a second area located outside the first area, wherein the first area includes:

an inner area including the optical axis of the objective lens; and an outer area located outside the inner area, wherein the outer area is configured to converge the third light beam on a data recording layer of the third optical disc with an amount of an aberration being substantially zero, wherein the objective lens satisfies a condition:

$$0.75 < h1a/h1 < 0.87 \quad (1)$$

where h1 represents an effective radius of the first area, and h1a represents an effective radius of the inner area.

2. The objective lens according to claim 1, wherein the inner area is configured to converge the second light beam on a data recording layer of the second optical disc with an amount of an aberration being substantially zero.

3. The objective lens according to claim 1, wherein:

the outer area has a diffracting structure having a function of converging the second and third light beams on data recording layers of the second and third optical discs, respectively; and the diffracting structure is configured such that a diffraction order at which diffraction efficiency for the second light beam is maximized is a first order, and a diffraction order at which diffraction efficiency for the third light beam is maximized is a first order.

4. The objective lens according to claim 1, wherein:

the second area has a first diffracting structure configured to converge the first and second light beams on data recording layers of the first and second optical discs, respectively, and not to contribute to convergence of the third light beam, the first diffracting structure is configured such that a diffraction order at which diffraction efficiency for the first light beam is maximized is a third order, and a diffraction order at which diffraction efficiency for the second light beam is maximized is a second order.

5. The objective lens according to claim 4, wherein the objective lens satisfies a condition:

$$f1 \times NA1 > f2 \times NA2 \quad (2)$$

where f1 represents a focal length of the objective lens when the first optical disc is used, and f2 represents a focal length of the objective lens when the second optical disc is used, wherein the at least one of surfaces of the objective lens includes a third area located outside the second area, wherein the third area has a second diffracting structure configured to converge only the first light beam on a data recording layer of the first optical disc, wherein the second diffracting structure is configured such that a diffraction order at which diffraction efficiency for the first light beam is maximized in the third area is different from a diffraction order at which diffraction efficiency for the first light beam is maximized in the second area.

6. The objective lens according to claim 4, wherein the objective lens satisfies a condition:

$$f1 \times NA1 < f2 \times NA2 \quad (3)$$

where f1 represents a focal length of the objective lens when the first optical disc is used, and f2 represents a focal length of the objective lens when the second optical disc is used, wherein the at least one of surfaces of the objective lens includes a third area located outside the second area, wherein the third area has a second diffracting structure configured to converge only the second light beam on a data recording layer of the second optical disc, wherein the second diffracting structure is configured such that a diffraction order at which diffraction efficiency for the second light beam is maximized in the third area is different from a diffraction order at which diffraction efficiency for the second light beam is maximized in the second area.

7. An optical pick-up used for recording data to and/or reproducing data from at least three types of optical discs having at least two different thicknesses of cover layers, comprising:

light sources capable of emitting at least three light beams having different wavelengths respectively corresponding to the at least three types of optical discs, one of the at least three light beams being selectively emitted when one of the at least three types of optical discs is used; and an objective lens, when a thickness of a first optical disc of the at least three types of optical discs to be used for recording data and/or reproducing data using a first light beam of the at least three light beams having a wavelength shortest of all the wavelengths of the at least three light beams is represented by t1, a thickness of a second optical disc of the at least three types of optical discs to be used for recording data and/or reproducing data using a second light beam of the at least three light beams having a wavelength longer than that of the first light beam is represented by t2, and a thickness of a third optical disc of the at least three types of optical discs to be used for recording data and/or reproducing data using a third light beam of the at least three light beams having a wavelength longest of all of the wavelengths of the at least three light beams is represented by t3, a relationship t1≦t2<t3 being satisfied, when a numerical aperture required for recording data to and/or reproducing data from the first optical disc is represented by NA1, a numerical aperture required for recording data to and/or reproducing data from the second optical disc is represented by NA2, and a numerical aperture required for recording data to and/or reproducing data from the third optical disc is represented by NA3, a relationship NA1≧NA2>NA3 being satisfied, the first, second and third light beams being incident on the objective lens as substantially collimated light beams, respectively, such that an amount of aberration caused during a tracking operation where the objective lens is shifted in a direction perpendicular to an optical axis direction of the objective lens, is corrected, wherein at least one of surfaces of the objective lens includes:

a first area for attaining the numerical aperture required for recording data to and/or reproducing data from the third optical disc; and a second area located outside the first area, wherein the first area includes:

an inner area including the optical axis of the objective lens; and an outer area located outside the inner area, wherein the outer area is configured to converge the third light beam on a data recording layer of the third optical disc with an amount of an aberration being substantially zero, wherein the objective lens satisfies a condition:

$$\text{wherein } 0.75 < h1a/h1 < 0.87 \quad (1)$$

where h1 represents an effective radius of the first area, and h1a represents an effective radius of the inner area, wherein if a wavelength of the first light beam is represented by $\lambda_1$, a refractive index of the objective lens for the first light beam is represented by $n_1$, a wavelength of the third light beam is represented by $\lambda_3$, and a refractive index of the objective lens for the third light beam is represented by $n_3$, the optical pick-up satisfies a condition:

$$\lambda_1/(n_1-1):\lambda_3/(n_3-1) \cong 1:2 \quad (4).$$

8. The optical pick-up according to claim 7, wherein the inner area of the objective lens is configured to converge the second light beam on a data recording layer of the second optical disc with an amount of an aberration being substantially zero.

9. The optical pick-up according to claim 7, wherein:

the outer area of the objective lens has a diffracting structure having a function of converging the second and third light beams on data recording layers of the second and third optical discs, respectively; and the diffracting structure is configured such that a diffraction order at which diffraction efficiency for the second light beam is maximized is a first order, and a diffraction order at which diffraction efficiency for the third light beam is maximized is a first order.

10. The optical pick-up according to claim 7, wherein:

the second area of the objective lens has a first diffracting structure configured to converge the first and second light beams on data recording layers of the first and second optical discs, respectively, and not to contribute to convergence of the third light beam, the first diffracting structure is configured such that a diffraction order at which diffraction efficiency for the first light beam is maximized is a third order, and a diffraction order at which diffraction efficiency for the second light beam is maximized is a second order.

11. The optical pick-up according to claim 10, wherein the optical pick-up satisfies a condition:

$$f1 \times NA1 > f2 \times NA2 \quad (2)$$

where f1 represents a focal length of the objective lens when the first optical disc is used, and f2 represents a focal length of the objective lens when the second optical disc is used, wherein the at least one of surfaces of the objective lens includes a third area located outside the second area, wherein the third area has a second diffracting structure configured to converge only the first light beam on a data recording layer of the first optical disc, wherein the second diffracting structure is configured such that a diffraction order at which diffraction efficiency for the first light beam is maximized in the third area is different from a diffraction order at which diffraction efficiency for the first light beam is maximized in the second area.

12. The optical pick-up according to claim 10, wherein the optical pick-up satisfies a condition:

$$f1 \times NA1 < f2 \times NA2 \quad (3)$$

where f1 represents a focal length of the objective lens when the first optical disc is used, and f2 represents a focal length of the objective lens when the second optical disc is used, wherein the at least one of surfaces of the objective lens includes a third area located outside the second area, wherein the third area has a second diffracting structure configured to converge only the second light beam on a data recording layer of the second optical disc, wherein the second diffracting structure is configured such that a diffraction order at which diffraction efficiency for the second light beam is maximized in the third area is different from a diffraction order at which diffraction efficiency for the second light beam is maximized in the second area.

* * * * *